United States Patent
Miller et al.

(10) Patent No.: US 9,795,940 B2
(45) Date of Patent: *Oct. 24, 2017

(54) CHAIN DRAG SYSTEM FOR TREATMENT OF CARBANEOUS WASTE FEEDSTOCK AND METHOD FOR THE USE THEREOF

(71) Applicant: Aemerge, LLC, Indianapolis, IN (US)

(72) Inventors: Landon C. G. Miller, Indianapolis, IN (US); Scott Behrens, Indianapolis, IN (US); Brian Rayles, Indianapolis, IN (US)

(73) Assignee: Aemerge, LLC, Indianapolis, IN (US)

( * ) Notice: Subject to any disclaimer, the term of this patent is extended or adjusted under 35 U.S.C. 154(b) by 479 days.

This patent is subject to a terminal disclaimer.

(21) Appl. No.: 14/457,541

(22) Filed: Aug. 12, 2014

(65) Prior Publication Data
US 2014/0348710 A1    Nov. 27, 2014

Related U.S. Application Data

(63) Continuation of application No. 13/927,904, filed on Jun. 26, 2013, now Pat. No. 8,801,904.
(Continued)

(51) Int. Cl.
*C10B 1/06* (2006.01)
*B01J 6/00* (2006.01)
(Continued)

(52) U.S. Cl.
CPC .............. *B01J 6/008* (2013.01); *C10B 1/06* (2013.01); *C10B 7/00* (2013.01); *C10B 47/40* (2013.01);
(Continued)

(58) Field of Classification Search
CPC . C10B 1/06; C10B 47/40; C10B 53/00; B01J 6/008
See application file for complete search history.

(56) References Cited

U.S. PATENT DOCUMENTS

| 1,944,749 A | 1/1934 | Loebell | 202/117 |
| 2,335,611 A | 11/1943 | Pray | 202/117 |

(Continued)

FOREIGN PATENT DOCUMENTS

| FR | 2594530 A1 | 8/1987 | C10B 53/08 |
| GB | 2140759 A | 12/1984 | B65G 23/44 |

(Continued)

*Primary Examiner* — Jonathan Miller
(74) *Attorney, Agent, or Firm* — Avery N. Goldstein; Blue Filament Law PLLC

(57) ABSTRACT

A drag chain carbonizer is provided with a system and methods for anaerobic thermal transformation processing to convert waste into various solid carbonized products and varied further co-products. The drag-chain carbonizer includes an adjustable bed depth mechanism, a heating mechanism, a pressure management mechanism, and a chain tensioning mechanism containing at least one position sensor for communication of an actuator position to at least one programmable logic controller (PLC). Carbonaceous waste is transformed into useful co-products that can be re-introduced into the stream of commerce at various economically advantageous points. Depending upon the input materials and the parameters selected to process the waste, including real time economic and other market parameters, the system adjusts co-products output to reflect changing market conditions.

22 Claims, 12 Drawing Sheets

Related U.S. Application Data

(60) Provisional application No. 61/667,751, filed on Jul. 3, 2012, provisional application No. 61/793,078, filed on Mar. 15, 2013.

(51) Int. Cl.

| | |
|---|---|
| *C10B 7/00* | (2006.01) |
| *C10K 1/10* | (2006.01) |
| *C10K 1/16* | (2006.01) |
| *C10K 1/18* | (2006.01) |
| *C10B 47/40* | (2006.01) |
| *C10B 53/00* | (2006.01) |
| *F22B 1/18* | (2006.01) |
| *F01K 17/04* | (2006.01) |

(52) U.S. Cl.
CPC ............. *C10B 53/00* (2013.01); *C10K 1/10* (2013.01); *C10K 1/16* (2013.01); *C10K 1/18* (2013.01); *F01K 17/04* (2013.01); *F22B 1/18* (2013.01); *Y02E 20/12* (2013.01); *Y02E 20/14* (2013.01); *Y02P 20/129* (2015.11); *Y02P 20/145* (2015.11)

(56) References Cited

U.S. PATENT DOCUMENTS

| | | | |
|---|---|---|---|
| 3,007,424 A | 11/1961 | Walker, Jr. ............... 110/101 R |
| 3,013,951 A | 12/1961 | Mansfield ................ 201/27 |
| 3,146,175 A | 8/1964 | Mansfield ................ 201/15 |
| 3,167,487 A | 1/1965 | Mansfield ................ 201/13 |
| 3,475,279 A | 10/1969 | Bowman .................. 201/32 |
| 3,515,078 A | 6/1970 | Maitilasso ............... 110/215 |
| 3,693,559 A | 9/1972 | Allen |
| 3,828,171 A * | 8/1974 | Griffin .................. G05B 13/025 208/164 |
| 3,870,652 A | 3/1975 | Whitten et al. ............ 502/434 |
| 4,067,462 A * | 1/1978 | Thompson .............. C10B 35/00 414/214 |
| 4,084,521 A | 4/1978 | Herbold et al. |
| 4,108,732 A | 8/1978 | Nuttall, Jr. |
| 4,122,036 A | 10/1978 | Lewis |
| 4,210,491 A | 7/1980 | Schulman |
| 4,235,676 A | 11/1980 | Chambers |
| 4,285,773 A * | 8/1981 | Taciuk .................. C10G 1/02 201/32 |
| 4,300,998 A | 11/1981 | Gartside |
| 4,301,750 A | 11/1981 | Fio Rito et al. |
| 4,412,889 A | 11/1983 | Oeck |
| 4,445,910 A | 5/1984 | Zimmerman ................ 48/76 |
| 4,452,152 A | 6/1984 | John et al. |
| 4,648,328 A | 3/1987 | Keough |
| 4,686,008 A | 8/1987 | Gibson |
| 4,732,092 A | 3/1988 | Gould |
| 4,765,256 A | 8/1988 | Caughey .................. 110/229 |
| 4,802,424 A | 2/1989 | McGinnis, III et al. |
| 5,072,675 A | 12/1991 | Fowler |
| 5,085,738 A | 2/1992 | Harris et al. |
| 5,207,572 A | 5/1993 | Deblock et al. |
| 5,280,701 A | 1/1994 | Tolman |
| 5,290,523 A | 3/1994 | Koppelman |
| 5,411,714 A * | 5/1995 | Wu ...................... C09C 1/482 110/108 |
| 5,500,120 A | 3/1996 | Baker |
| 5,636,580 A | 6/1997 | Kanis |
| 5,666,890 A | 9/1997 | Craig |
| 6,067,915 A | 5/2000 | Sharpe |
| 6,149,880 A | 11/2000 | Higo et al. |
| 6,213,029 B1 | 4/2001 | Potter et al. |
| 6,221,329 B1 | 4/2001 | Faulkner et al. |
| 6,619,214 B2 | 9/2003 | Walker |
| 6,852,293 B1 * | 2/2005 | Ronchi .................... C10J 3/66 110/229 |
| 6,878,212 B1 | 4/2005 | Pinatti et al. |
| 7,025,940 B2 | 4/2006 | Shah et al. |
| 7,117,989 B2 | 10/2006 | Weigel et al. ............ 198/810.04 |
| 7,169,197 B2 | 1/2007 | Serio et al. |
| 7,241,323 B2 | 7/2007 | Serio et al. |
| 7,341,646 B2 | 3/2008 | Nichols et al. |
| 7,648,615 B2 | 1/2010 | Araki ..................... 201/18 |
| 7,753,678 B2 | 7/2010 | Teeter et al. |
| 7,931,783 B2 | 4/2011 | Dam-Johansen et al. |
| 7,976,593 B2 | 7/2011 | Graham |
| 8,092,752 B2 | 1/2012 | Davis |
| 8,518,218 B2 | 8/2013 | Ali et al. ................ 202/117 |
| 2001/0027737 A1 | 10/2001 | Abrams .................. 110/234 |
| 2004/0055517 A1 | 3/2004 | Nunemacher |
| 2004/0175308 A1 | 9/2004 | Zeller |
| 2009/0035211 A1 | 2/2009 | Lafontaine et al. |
| 2010/0187161 A1 | 7/2010 | Anastasijevic et al. |
| 2011/0008865 A1 | 1/2011 | Lee |
| 2011/0036320 A1 | 2/2011 | Peret |
| 2011/0108404 A1 * | 5/2011 | Firey .................... C10B 1/04 202/84 |

FOREIGN PATENT DOCUMENTS

| | | | | |
|---|---|---|---|---|
| KR | 2011109154 A | 10/2011 | ............. | F23G 7/12 |
| WO | 2008072052 A2 | 6/2008 | | |
| WO | WO2011008074 A1 * | 1/2011 | ............. | C10B 7/06 |

* cited by examiner

CHAIN DRAG SYSTEM FOR TREATMENT OF CARBANEOUS WASTE FEEDSTOCK AND METHOD FOR THE USE THEREOF

RELATED APPLICATIONS

This application is a continuation of U.S. Utility application Ser. No. 13/927,904; filed 26 Jun. 2013; now U.S. Pat. No. 8,801,904 issued Aug. 12, 2014, that in turn claims priority benefit of U.S. Provisional Application Serial number 61/667,751; filed Jul. 3, 2012; and U.S. Provisional Application Serial number 61/793,078, filed Mar. 15, 2013; the contents of which are hereby incorporated by reference.

FIELD OF THE INVENTION

The present invention in general relates to a system for transforming organic waste into useful co-products, including hydrocarbon based gases, hydrocarbon-based liquids, and carbonized material; and in particular to a system having as its transformative element an anerobic, negative pressure, or carbonization system.

BACKGROUND OF THE INVENTION

Pyrolysis is a general term used to describe the thermochemical decomposition of organic material at elevated temperatures without the participation of oxygen. Pyrolysis differs from other high-temperature processes like combustion and hydrolysis in that it usually does not involve oxidative reactions and is often characterized by irreversible simultaneous change of chemical composition and physical phase.

Pyrolysis is a case of thermolysis, and is most commonly used for organic materials, and is one of the processes involved in charring. Charring is a chemical process of incomplete combustion of certain solids when subjected to high heat. The resulting residue matter is called char. By the action of heat, charring reductively removes hydrogen and oxygen from the solid, so that the remaining char is composed primarily of carbon in a zero oxidation state. Polymers such as thermoplastics and thermoset, as well as most solid organic compounds like wood and biological tissue, exhibit charring behavior when subjected to a pyrolysis process, which starts at 200-300° C. (390-570° F.) and goes above 1000° C. or 1800° F., and occurs for example, in fires where solid fuels are burning. In general, pyrolysis of organic substances produces gas and liquid products and leaves a solid residue richer in carbon content, commonly called char. Extreme pyrolysis, which leaves mostly carbon as the residue, is called carbonization.

The pyrolysis process is used heavily in the chemical industry, for example, to produce charcoal, activated carbon, methanol, and other chemicals from wood, to convert ethylene dichloride into vinyl chloride to make PVC, to produce coke from coal, to convert biomass into syngas and biochar, to turn waste into safely disposable substances, and for transforming medium-weight hydrocarbons from oil into lighter ones like gasoline. These specialized uses of pyrolysis are called by various names, such as dry distillation, destructive distillation, or cracking. Efficient industrial scale pyrolysis has proven to be difficult to perform and adjust reactor conditions to feedstock variations in order to achieve a desired degree of carbonization.

Cogeneration also referred to as combined heat and power (CHP) is the use of a heat engine or a power station to simultaneously generate both electricity and useful heat. All thermal power plants emit a certain amount of heat during electricity generation. The heat produced during electrical generation can be released into the natural environment through cooling towers, flue gas, or by other means. By contrast, CHP captures some or all of the by-product heat for heating purposes, or for steam production. The produced steam may be used for process heating, such as drying paper, evaporation, heat for chemical reactions or distillation. Steam at ordinary process heating conditions still has a considerable amount of enthalpy that could be also be used for power generation.

Transforming waste from a liability to an asset is a high global priority. Currently employed technologies rely on incineration to dispose of carbonaceous waste with useable quantities of heat being generated while requiring scrubbers and other pollution controls to limit gaseous and particulate pollutants from entering the environment. Incomplete combustion associated with conventional incinerators and the complexities of operation in compliance with regulatory requirements often mean that waste which would otherwise have value through processing is instead sent to a landfill or incinerated off-site at considerable expense. Alternatives to incineration have met with limited success owing to complexity of design and operation outweighing the value of the byproducts from waste streams.

To address this global concern, many methods have been suggested to meet the flexible needs of waste processing. Most of these methods require the use of a waste processing reactor, or heat source, which are designed to operate at relatively high temperature ranges 200-980° C. (400 to 1800° F.) and allow for continuous or batch processing.

An essential element of chemical reactors used in waste processing is for a reactor to enhance mixing and reduce variable reactive conditions associated with spatial variation in the waste material being processed. It should be appreciated that these features should be optimized in order to create conditions which maximize heat diffusion, through material convection, in order to reduce the amount of processing time. While those variables are readily controlled in pilot scale systems, industrial scale processing has proved difficult.

Various reactor feed and waste treatment devices are currently available in the industry. Many devices operate to produce a steady flow of material to a reactor, with varying methods of compaction. These conventional devices are not satisfactory, however, in that they are not versatile enough to process and adequately compress the variety of waste materials.

Currently, many conventional waste treatment devices utilize a compression auger-screw to shred and compact various waste forms for disposal and further processing. However, these devices usually have a fixed compression ratio which cannot account for the various types of waste materials to be processed.

Thus, there exists a need for a waste processing reactor which can transform a waste stream from a liability on an industrial scale and without allowing contaminant release. There further exists a need for a process of waste reaction that is efficient to operate to limit environmental pollution in the course of such a transformation, and to produce useful co-products that aid on the overall economic value of the process.

SUMMARY OF THE INVENTION

A drag chain pyrolysis system is provided with an apparatus and methods for anaerobic thermal transformation processing to convert waste into bio-gas; bio-oil; carbonized materials; non-organic ash, and varied further co-products. In still other embodiments of the inventive technology presented herein, any carbonaceous waste is transformed into useful co-products that can be re-introduced into the stream of commerce at various economically advantageous points. Other embodiments of the present invention have utility to support a variety of processes, including to make, without limitation, carbon inks, dyes and plastics coloration materials, activated carbon, aerogels, bio-coke, and bio-char, as well as to generate electricity, produce adjuncts for natural gas, and/or various aromatic oils, phenols, and other liquids, all depending upon the input materials and the parameters selected to process the waste, including real time economic and other market parameters which can result in the automatic re-configuration of the system to adjust its output co-products to reflect changing market conditions.

In inventive embodiments an inventive carbonization process is performed in a novel fashion, with a wide variety of possible operating configurations and parameters to adjust product mixes and waste stream throughput. Embodiments of the inventive system are readily re-configured, and system operating parameters changed, some parameters in real time, to adjust co-product outputs and percentages thereof to reflect on-going market demand conditions for co-product outputs.

An inventive system configuration in some embodiments includes carbonization process heat source generators, such as thermal oxidizers, that run on a mixture of natural gas and reaction-produced carbonization process gases re-circulated to transform the heat through the use of either conventional steam boilers or to Organic Rankin Cycle strategies to operate electrical turbine generators, or in the alternative, to conventional or novel reciprocating engine driven generators, and thereby generate the heat needed to produce power while also operating the carbonization process. This heat capture produces more waste heat than is used to heat water and generate steam for turbines or steam reciprocating engines. This heat in some inventive embodiments is used to preheat feedstock or for other larger process purposes. The pre-processing heating system preheats feedstock material prior to entering the reactor tube to both reduce moisture and improve overall system yield. Carbonized products are also produced that in some inventive embodiments are processed via chemical, water washing, centrifuging, membrane or other filtering, and other further processing techniques to produce either black inks and dyes, activated carbon, bio-char, bio-coke, or other valuable carbon products, including the physical processes required to aggregate the carbon into pearls, briquettes, various aggregates, and various mesh sized powder forms. Still other embodiments of an inventive system have generators that are not used for heat and instead natural gas combustion is used directly for heating feedstock so as to generate electricity after mixing carbonization gases, and other post—processing products. Additionally, it is appreciated that other products of an inventive process include oils and waxes that are amenable to collection and optional subsequent processing or introduction as a source of thermal energy to an inventive system. Subsequent oil processing components illustratively include centrifuges for separating light and heavy oils, various filter strategies for separating co-product output elements, and the like.

An inventive carbonization system in specific inventive embodiments utilize a thermo-chemical reactor which may be a drag-chain reactor, batch, continuous-stirred-tank, and plug-in reactors.

In certain inventive embodiments, a drag-chain reactor is operated with variation to: bed depth; speed; temperature ranges 200 to 780° C., (400 to 1800° F.); bed width; positive and/or negative pressures, and continuous or real-time processing under rule-based control systems or a combination thereof. A control system operative herein is appreciated to utilize variable processing formulas, negative or positive pressures, variable, dwell time control, and other processing variable controls. As a result, an inventive system is readily modified to process a wide variety of organic wastes, illustratively including, infectious wastes such as medical waste, plastics, bone meal, carpets, asphalt shingles, oil derived waste such as auto shredder waste, tires, bio-mass, waste water sludge, and the like; bitumen; or any other carbonaceous based matter containing C—H or C—O bonds, including C=O and C—OH bonds.

In other inventive embodiments, an inventive reactor tube embodies several attributes which include any number of, but shall not be limited to, the following abilities: a variable process temperature with adjustable burner set points; an adjustable material processing dwell time; an adjustable drag chain "forward-reverse" walking feature; and an ability to mechanically control bed depth. The adjustable burner control temperature set points are maintained and controlled by a feedback loop determined by one or more reactor oven thermocouples.

In inventive certain embodiments where an adjustable material processing dwell time is present, material processing time is based on the linear drag chain movement through the length of reactor which is determined by setting the process dwell time value accessible on the control panel human machine interface (HMI)/programmable logic controller (PLC) operating program that maintains the desired drive motor speed via the variable-frequency drive (VFD) motor control which regulates the frequency to the chain drive motor in relationship to the pre-calculated chain speed—tube length—drive motor speed combinations. It should be appreciated that the meaning of dwell time, in the context of this embodiment, is the residence time material remains in a tube reactor for processing.

In any embodiment where an adjustable drag-chain "forward-reverse" walking feature is incorporated, the ability to "walk" the feed material in a fully adjustable "2-steps forward 1-step back" fashion based on forward/reverse set points is accessible on the control panel HMI/PLC operating program which regulates the alternating length of forward/reverse time that the VFD drive motor control powers the chain drive motor. In still other inventive embodiments, the drive motor operated drag-chain moves feedstock material when present in the reactor tube to impart mechanical agitation to the feedstock material. In other embodiments the drag chain is powered by hydraulic or other mechanical and/or electronic/electrical means consistent with the application needs.

An inventive system is in certain inventive embodiments utilized to separate a mineral or metal from a surrounding organic material matrix. Indications for such separations illustratively include hazardous metals in soil and catalysts from waste synthetic polymers. Another important element is the use of an air-seal, which not only aids mixing and heat diffusion, but allows pressurization of, or the creation of a partial or complete vacuum within the reactor for various reasons, including preventing any air contaminants from escaping the reactor, and managing the flow of gases within the overall reactor and associated processing elements.

BRIEF DESCRIPTION OF THE DRAWINGS

The present invention is further detailed with respect to the following drawings. These figures are not intended to limit the scope of the present invention but rather illustrate certain attributes thereof.

DESCRIPTION OF THE INVENTION

Figure 1:
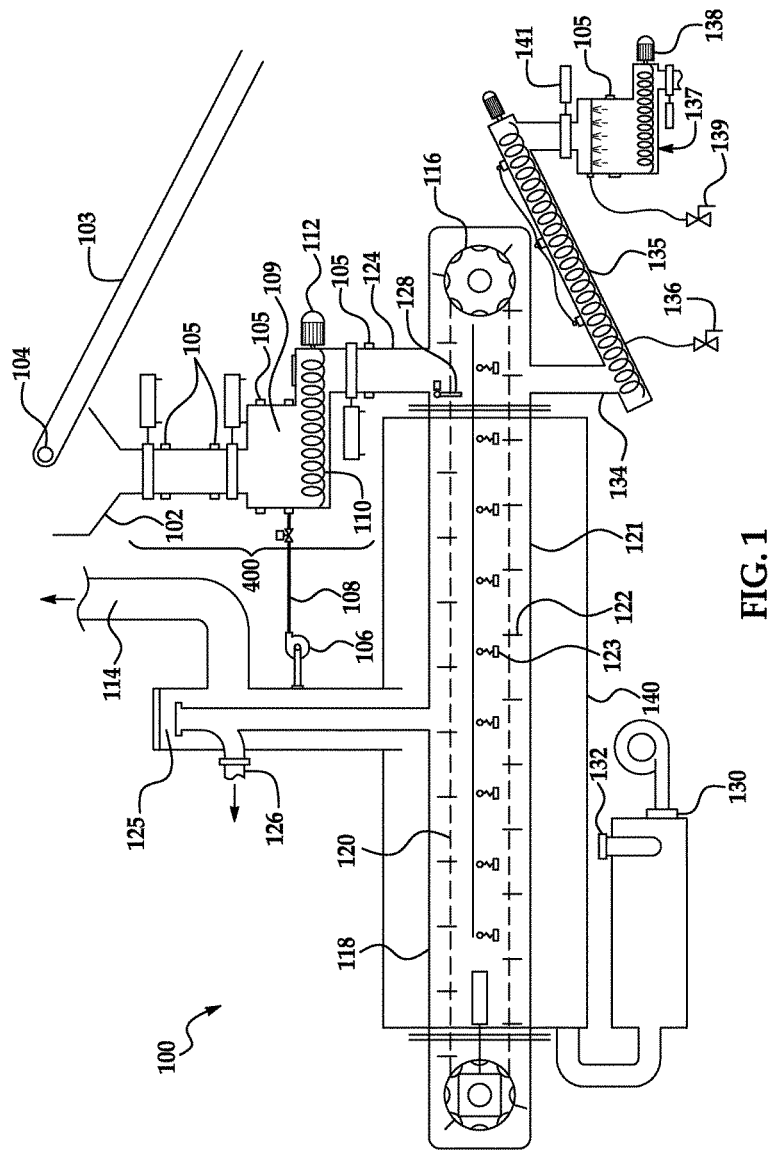
FIG. 1 is a diagram of a drag line reactor based carbonizer system.

An inventive drag chain carbonizer is provided with an apparatus and process for anaerobic thermal transformation processing to convert waste into bio-gas; bio-oil; carbonized materials; non-organic ash, and varied further co-products. In the inventive technology presented herein, any carbonaceous waste is transformed into useful co-products that can be re-introduced into the stream of commerce at various economically advantageous points. The present invention has utility to support a variety of processes, including to make, without limitation, carbon, carbon-based inks and dyes, activated carbon, aerogels, bio-coke, and bio-char, as well as generate electricity, produce adjuncts for natural gas, and/or various aromatic oils, phenols, and other liquids, all depending upon the input materials and the parameters selected to process the waste, including real time economic and other market parameters which can result in the automatic re-configuration of the system to adjust its output co-products to reflect changing market conditions. It is of note that conventional products such as coke, or activated carbons, or petroleum derived carbon blacks, all typically derived from coal and/or petroleum, contains numerous hazardous materials such as mercury, selenium, sulphur, and radioactive elements.

As used herein, the terms "carbonized material", "carbonaceous product" and "carbonaceous material" are used interchangeably to define solid substances at standard temperature and pressure that are predominantly inorganic carbon by weight and illustratively include char, bio-coke, carbon, activated carbon, aerogels, fullerenes, and combinations thereof.

It is surprisingly noted that unlike conventional continuous operation pyrolysis systems, an inventive system can retain the cellular structure of a feedstock material through control of operational parameters, including temperature to produce aerogels from cellular matrices such as watermelon fruit, tree pith, citrus fruit and the like. The resulting carbonaceous aerogels are produced with bulk densities of from 0.5 to 20 $kg/m^3$ and have exceptional thermal insulation properties while still being electrically conductive. Control of feedstock dehydration rate and pyrolysis rate appear to be important parameters in aerogel production that retains the cell wall structure, as opposed to a collapsed structure observed in char and other common forms of inorganic carbon produced by conventional pyrolysis systems. It is appreciated that a feedstock is readily treated with a variety of solutions or suspensions prior to carbonizer to modify the properties of the resulting inorganic carbon product. By way of example, solutions or suspensions of metal oxides or metal salts are applied to a feedstock to create an inorganic carbon product containing metal or metal ion containing domains. Metals commonly used to dope an inorganic carbon product illustratively include iron, cobalt, platinum, titanium, zinc, silver, and combinations of any of the aforementioned metals.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Since the core element of the inventive process is carbonization performed in a novel fashion, there are a wide variety of possible operating configurations and parameters to adjust product mixes and waste stream throughput to address at least in part the aforementioned humidity of the prior art. An inventive system is readily re-configured, and its operating parameters changed, some in real time, to adjust co-product outputs and percentages thereof to reflect on-going market conditions. For illustrative purposes, wood, before entering the process, can have its moisture removed, but not so much as to "burst" the plant cells within the cellular structure of the wood by quickly boiling its contained water and thus destroy the cellular fabric of the wood in such as manner as to make the resultant carbonaceous material useless for lack of remaining inherent structure, as in activated carbon, for example. The temperature range, duration of exposure, mixing rate, and other factors claimed as part of the inventive process, machine and system of systems herein are thus focused on controlling the many variables inherent in such anaerobic thermal transformation processes in order to produce results with utility for future use as opposed to just destruction.

An inventive system configuration in some certain embodiments includes carbonization process heat source generators that run on a mixture of natural gas and reaction-produced carbonization process gases re-circulated to operate the drag chain reactor and thereby generate the heat needed to operate the carbonization process. This heat capture in turn produces more waste heat that is used to heat water and generate steam for turbines or steam reciprocating engines. This heat in some inventive embodiments is then also used to preheat feedstock or to produce electricity. The pre-processing heating system preheats feedstock material prior to entering the reactor tube. Certain other inventive embodiments also includes one or more of post-reactor gas and oil separation-scrubbing system, a post-reactor gas recirculating system, a post-reactor carbonaceous material processing system, and a post-reactor electrical power system using either steam generating systems, or other heat-to-power transfer transfer systems such as those employing organic rankin cycle techniques. Carbonized products are also produced that in some inventive embodiments are processed via chemical, water washing, centrifuging, membrane or other filtering, and other further processing techniques to produce either carbon, inks, dyes, plastic coloration, activated carbon, bio-char, bio-coke, or other valuable carbon products, including the physical processes required to aggregate the carbon into pearls, briquettes, and other media for handling and duration purposes, amongst many such purposes. Other elements of this inventive system have generators that are not used for heat and instead natural gas combustion is used directly for heating feedstock so as to generate electricity after mixing carbonization gases, and other post—processing products. Additionally, it is appreciated that other products of an inventive process include oils and waxes that are amenable to collection and optional subsequent processing or introduced as a source of thermal energy to an inventive system. Subsequent oil processing components illustratively include centrifuges for separating light and heavy oils, various filter strategies for separating co-product output elements, and the like.

An inventive carbonization system in specific inventive embodiments also utilizes a thermo-chemical reactor which may be a drag-chain reactor, batch, continuous-stirred-tank, thermal oxidizers, and plug-in reactors.

In one inventive embodiment, it is appreciated that a drag-chain reactor is operated with variability as to at least one of: bed depth; speed; temperature ranges 200 to 780° C., (400 to 1800° F.); bed width; continuous, or real-time processing under rule-based control systems. A control system operative herein is appreciated to utilize variable processing formulas, negative or positive pressures, variable dwell time control, and other processing variable controls. As a result, an inventive system is readily modified to process a wide variety of organic wastes, illustratively including, infectious wastes such as medical waste, plastics, oil derived waste such as auto shredder waste, tires, biomass, waste water sludge, and the like; bitumen; or any other carbonaceous based matter containing C—H or C—O bonds, such as C=O and C—OH bonds.

An inventive reactor tube embodies several attributes which include any number of, but shall not be limited to, the following abilities: a variable process temperature with adjustable burner set points; an adjustable material processing dwell time; an adjustable drag chain "forward-reverse" walking feature; and an ability to mechanically control bed depth.

In one embodiment of the present invention where a variable process temperature with adjustable burner set point is used, the variable temperature set points may be anywhere within the ranges of 200 to 980° C. (400 to 1800° F.). In at least one embodiment, the variable process temperature is up to 650° C. (1200° F.) as determined by adjustable burner control temperature set points wherein the temperature is maintained and controlled by a feedback loop determined by one or more reactor oven thermocouples.

In other inventive embodiments where an adjustable material processing dwell time is present, material processing time is based on the linear drag chain movement through the length of reactor which is determined by setting the process dwell time value accessible on the control panel human machine interface (HMI)/programmable logic controller (PLC) operating program that maintains the desired drive motor speed via the variable-frequency drive (VFD) motor control which regulates the frequency to the chain drive motor in relationship to the pre-calculated chain speed—tube length—drive motor speed combinations. It should be appreciated that the meaning of dwell time, in the context of this embodiment, is the residence time material remains in a tube reactor for processing.

In any embodiment where an adjustable drag-chain "forward-reverse" walking feature is incorporated, the ability to "walk" the feed material in a fully adjustable "2-steps forward 1-step back" fashion based on forward/reverse set points is accessible on the control panel HMI/PLC operating program which regulates the alternating length of forward/reverse time that the VFD drive motor control powers the chain drive motor. In still other inventive embodiments the drive motor operated drag-chain moves feedstock material when present in the reactor tube to impart mechanical agitation to the feedstock material. In still other inventive embodiments the drive motor operated drag-chain moves feedstock material is powered by hydraulics, or other power imparting techniques. It should be appreciated that this process assists in heat transfer diffusion across the feed material in a given process and assists in compressing the feed material, thus improving the overall heat transfer for processing the feed material.

An inventive system is in certain inventive embodiments utilized to separate a mineral or metal from a surrounding organic material matrix. Indications for such separations illustratively include hazardous metals in soil and catalysts from waste synthetic polymers.

Another important element of an inventive system is the use of an air-seal, which not only aids mixing and heat diffusion, but allows pressurization of, or the creation of a partial or complete vacuum within the reactor for various reasons, including preventing gaseous contaminants from escaping the reactor, managing pressures, and managing the flow of gases within the overall reactor and associated processing elements.

Figure 2:
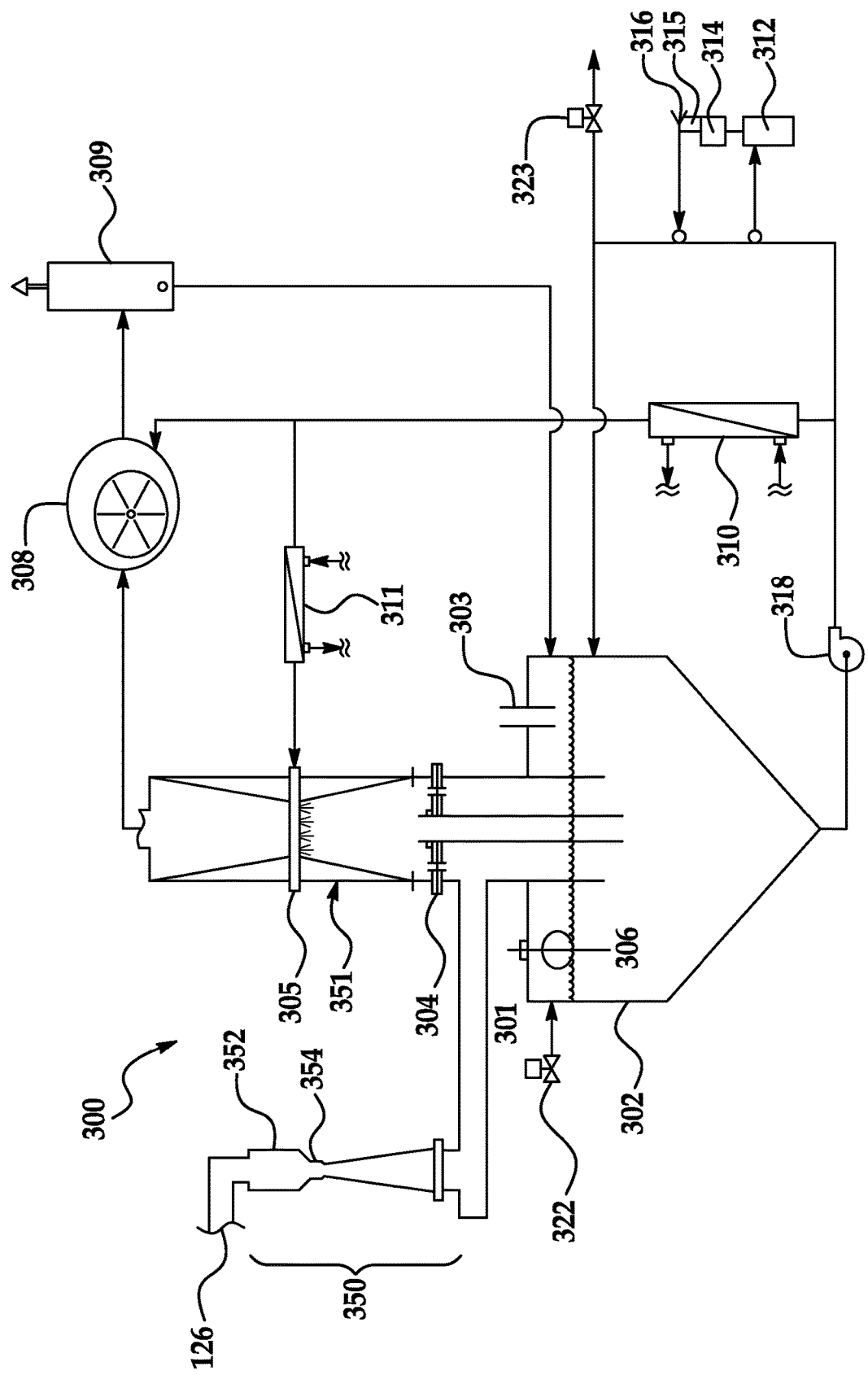
FIG. 2 is a diagram of a scrubber that is part of the system of FIG. 1.

Referring now to the figures, embodiments of an inventive implementation of a drag chain carbonizer are described. FIG. 1 is a diagram of a drag chain carbonizer 100 utilizing a drag-chain reactor 118 with a conveyor in the form of a drag-chain 120 with variable internal bed depth control 128 employing anaerobic thermal transformation processing to convert waste into bio-gas, bio-oil, char and non-organic ash. The drag-chain reactor 118 is appreciated to be either a single or multiple deck form thereof. The use of negative pressure throughout the system 100 is maintained by using a "liquid ring pump" (LRP) 308, for four various stages of gas scrubbing, as shown in FIG. 2. Various types of scrubbers operative herein, alone or in combination, include: venturi movement, impingement scrubber (perforated orifice plate with flooded top surface), down draft scrubber with optional heat exchanger and secondary cooling, and liquid ring pump. It is appreciated that multi-stage post reactor components are employed directly attached, as a single or multi-staged scrubbing system (see FIG. 2). Such scrubbing systems employ either water, or an organic solvent such as methanol, ethanol, or kerosene to inhibit tar and other high molecular weight aliphatic or aromatic formation. In certain inventive embodiments, the gas and oil separation-scrubbing system employs either a spray of water or a room temperature liquid organic solvent. Alternatively or in combination with quad scrub system 300, a distillation unit (not shown) is provided in certain in still other inventive embodiments for separating various molecular weight organics, or a batch hydrolysis process for producing tar or other high molecular weight products as exemplified by asphalt precursor oil.

Figure 6:
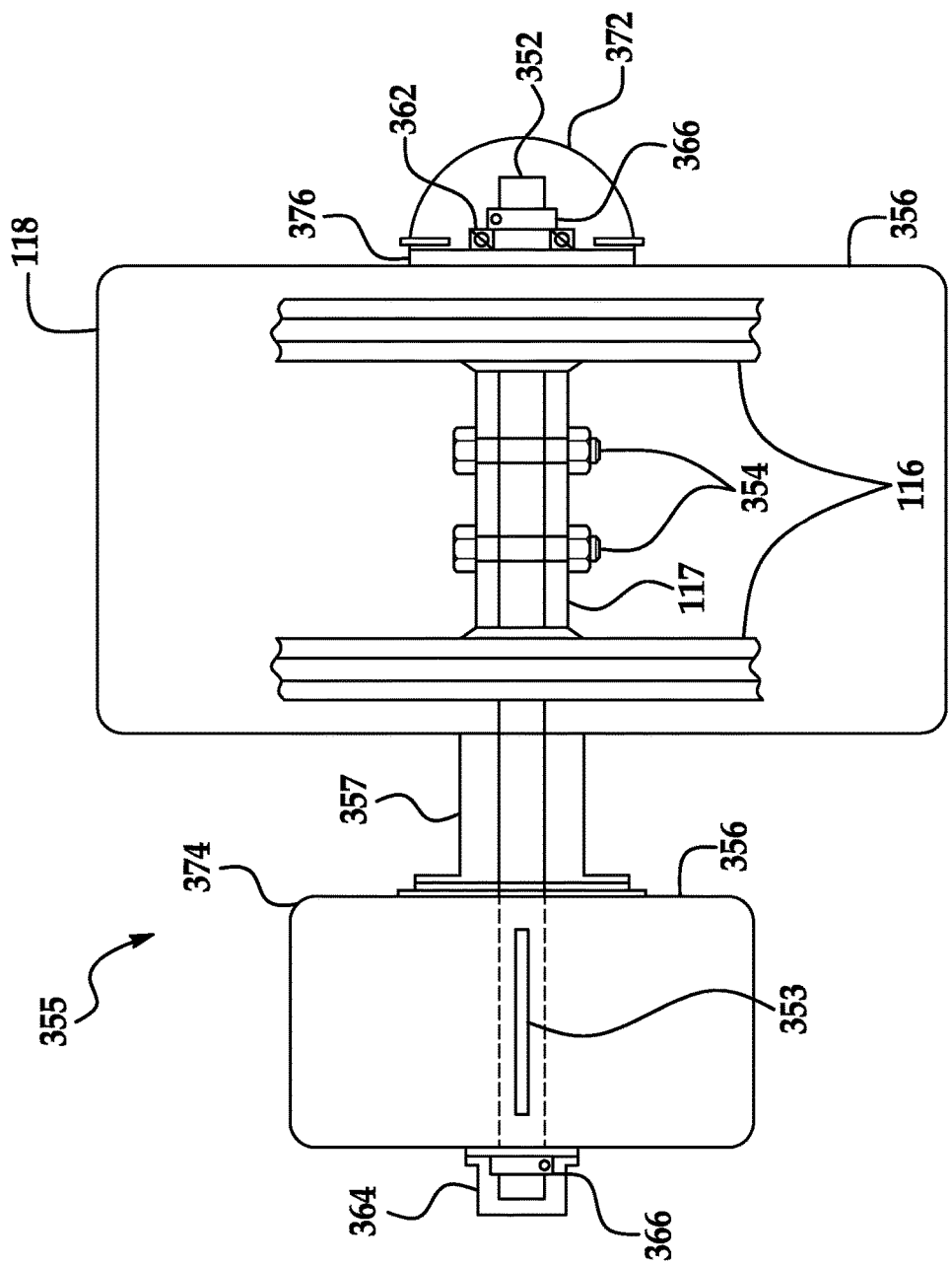
FIG. 6 is a detailed view of the drive shaft bearings for drive chain gear sprockets driving the conveyor bed through the reactor oven of FIG. 1.

A negative pressure/vacuum is also maintained in the system 100 through the use of a tri-lock feeder and pressure equalizer system 400 (see FIGS. 1 and 7) that is operative for purging, capturing, and pressure maintenance during metering incoming waste streams while maintaining negative pressure throughout the system 100, and by employing a sealed output shaft housing 372 that fastens directly to a sealed gearbox 374 as shown in FIG. 6 with shaft 352 linking a gear drive gearbox 374 to provide rotational movement of the drive chain sprockets 116 that move the conveyor in the form of a drag-chain 120 in the single or multiple deck reactor 118.

Figure 5A:
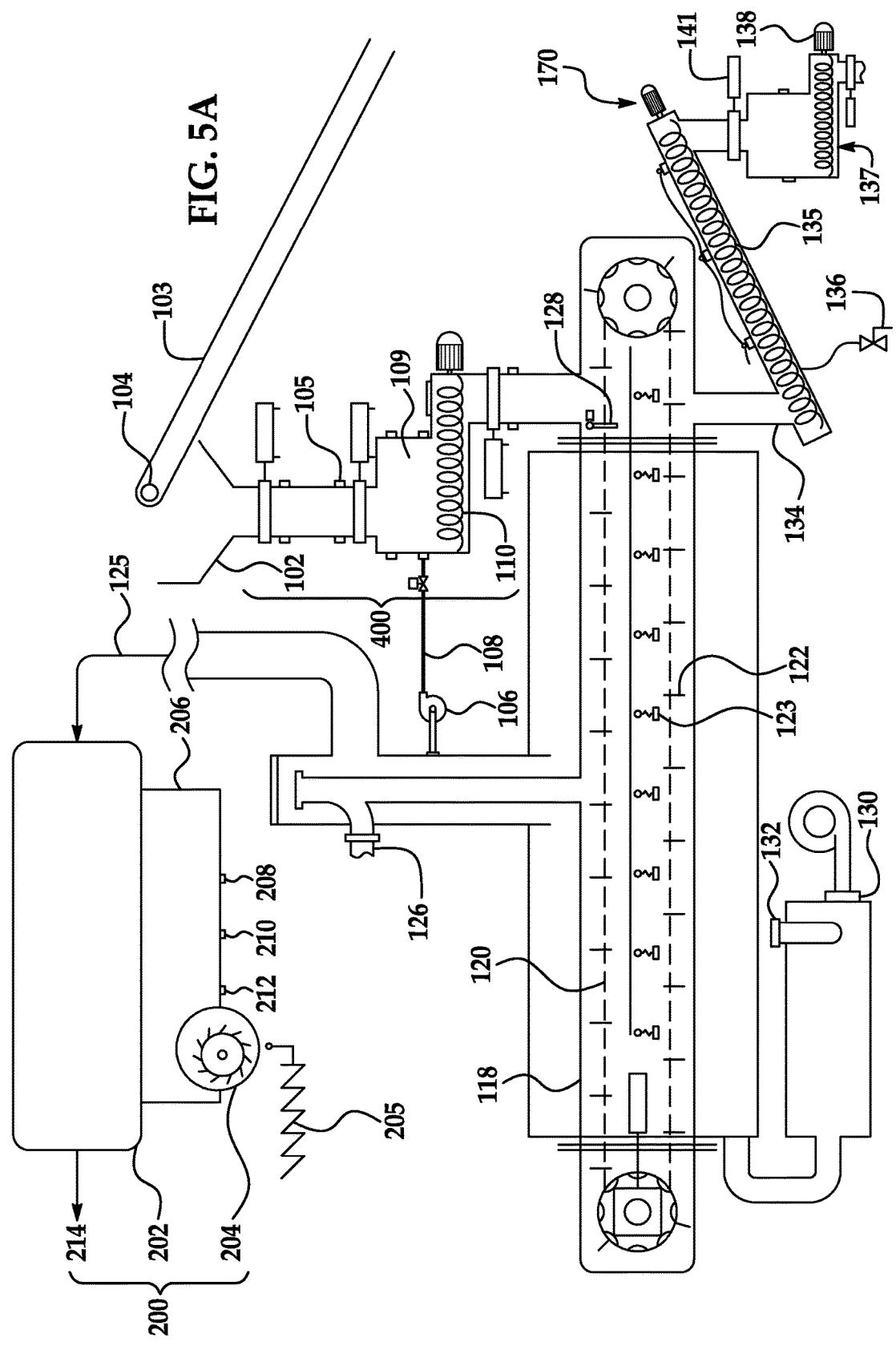
FIG. 5A illustrates a detailed view of a waste heat boiler and turbine that is part of the system of FIG. 1.
Figure 5B:
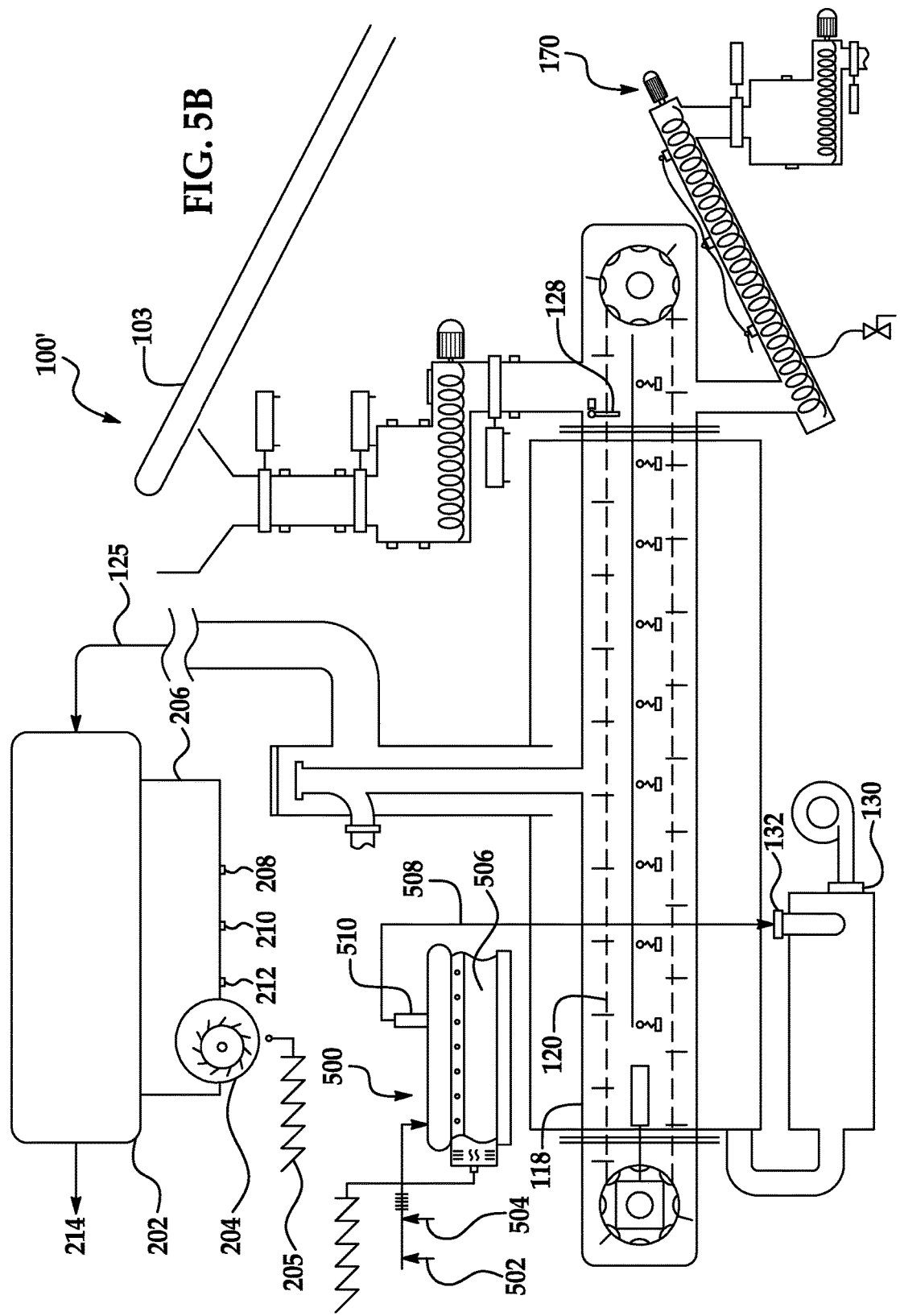
FIG. 5B illustrates a detailed view of a waste heat boiler and turbine with a CHP unit that is part of a system that is configured like the system of FIG. 1.

In certain embodiments of the inventive drag chain carbonizer 100, low pressure steam 150-320° C., (300-600° F.), heated by output co-products (bio-oil and bio-gas) or external fuel stocks or electrical heating along with reactor waste heat, are used in certain inventive embodiments for purposes illustratively including: to clean, purge, emergency shutdown, and produce electrical power using turbines or steam reciprocating engines capable of producing reliable and consistent base load power using active bus-based inverters (see FIGS. 5A and 5B). Furthermore, in specific inventive embodiments, the management of anaerobic thermal transformation process variables, illustratively including dwell time, agitation, speed, pressure, temperature, bed depth, and pre-heating are provided through a single integrated system hardware and software platform, or multiple modules each performing less than the complete compliment of management functions. In other specific embodiments, redundant integrated systems or modules operate as back-ups in the event of control failure during operation. In addition, the system 100 in certain inventive embodiments utilizes a rule-based, scenario driven economic modeling control subsystem for directing system output variations based on real time market selection information.

In some embodiments, the system 100 is configured with the ability to tilt the entire dwell bed of the tractor or conveyor in the form of a drag-chain 120 to permit processing of different materials with different densities and flow characteristics (e.g., plastics, tire chunks, auto shredder waste, wood chips, etc.). The conveyor drag-chain 120 has blades 122 to push materials along through the single or multiple deck rectangular or square tube shaped reactor 118, while the angle or tilt is adjusted with the variable internal bed depth control 128. The blades 122 also act to push materials carried along the conveyor drag-chain 120 against the bottom surface 121 of the reactor chamber housed within the oven chamber box 140 within the double deck reactor 118. In an inventive embodiment, the blades 122 are deformable to join to the chain-drag 120.

A burner 130 is employed in the system 100 to generate primary heat, to boost output air temperature from upstream combustion processes 132 or both, such processes illustratively include: generators, external heat sources, downstream recirculated oil, gas burners, exhaust oven gas 125, or combinations thereof. A burner 130 operative herein is appreciated to be in-line in certain embodiments. The burner 130 is illustratively pressurized or operative at ambient pressure. The burner 130 is adapted to combust liquid fuel, gas fuel, or a combination thereof. The burner 130 transfers heat to system 100 to aid in heating the anaerobic thermal transformation process in the single or multiple deck reactor 118, thereby substantially reducing the direct heating requirements for anaerobic thermal process.

In operation, feed material is transferred via a conveyor 103 driven by motor 104 and dispensed into a feed hopper 102 where it is dropped through the triple valve/tipping gate feed metering auger air lock system 400 regulated with the use of at least one sensor 105 to confirm and control material level (see FIGS. 1 and 7) where nitrogen or other inert gas can be injected via pipe 108 into the metering hopper 109 aiding to pre-heat the material and purge oxygen therefrom. It is appreciated that an upper feed lock system is configured differently than that shown at 400 to achieve atmospheric isolation and operates in certain inventive embodiments with less of the depicted complement of valves, sensors, and blowers to achieve an oxygen depleted environment. Following travel through the upper feed lock system 400, material dropped into the metering hopper 109 is transferred via auger 110, that is driven by motor 112 into the feed chute 124. The material drops down the chute 124 past the final airlock mechanism of system 400 and on to the conveyor drag-chain 120 in the reactor oven 118, where the material is heated while moving along the conveyor drag-chain 120.

Following the material travel within the reactor oven 118 and depending on material bed depth, the material is contacted by random weighted hanging plow blocks 123 to disturb and mix the material mass during transit of the length of the reactor oven 118. Once the material reaches the end of the reactor oven 118, the material drops down the char chute 134 into a dry and/or partially submerged char discharge/auger tube 135 that is equipped in specific inventive embodiments with a spray dispersion suppression system 136 to create a cooled, dust-free powder for transfer through the char discharge air lock system 141 with discharge metering hopper 137 driven by motor 138 which also regulates for material confirmation and control via through beam sensors 105. The powder in hopper 137 in some embodiments is subjected to further other reactants or additives such as anti-dust agents, via manifold 139 and are employed for activating or reacting the carbon char within the sealed hopper 137, as explained in FIG. 3. Either a nitrogen or other inert gas, or the oven exhaust gas 125 is feed from the powder reactor oven 118 to the air lock purge blower 106 that injects oxygen depleted oven gas 125 supplied via pipe 108 to purge the feed lock system 400, as described above. In addition, oven exhaust gas 125 is supplied, in some embodiments, to waste heat boiler and turbine system 200 via pipe 114 as is explained in greater detail in FIG. 5A. Oven off-gas 125 that is a byproduct of the heated material in the reactor oven 118 is supplied in some inventive embodiments to the scrubber system 300 that is explained in greater detail in FIG. 2.

Referring now to FIG. 2, in which like numerals having the meanings attributed thereto with respect to the aforementioned figures, a quad-scrub system 300 is shown that provides four sequential methods of off-gas 125 scrubbing to remove particulate from the gas stream. The quad-scrub system 300 operates in specific inventive embodiments in condensing vapor components with a common drain to scrub recirculated fluid from the scrub tank 302. The scrub tank 302 in certain inventive embodiments is continuously side stream filtered for removal of suspended solids and condensed liquids of different specific gravity than the scrubbing fluid to enhance the efficiency of the system 300

Figure 4A:
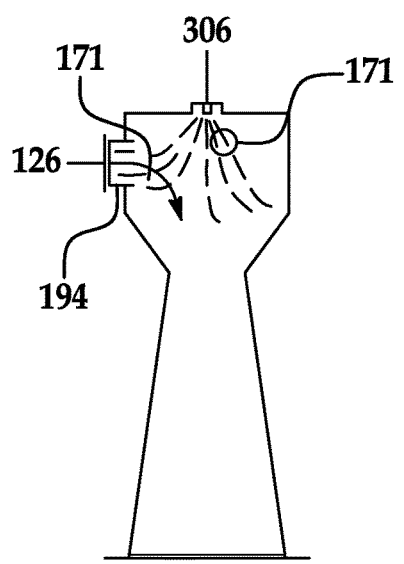
FIGS. 4A and 4B illustrates an existing prior art venturi design (FIG. 4A) and an improved venturi design (FIG. 4B), respectively that is part of the scrubbing system of FIGS. 1 and 2.
Figure 4B:
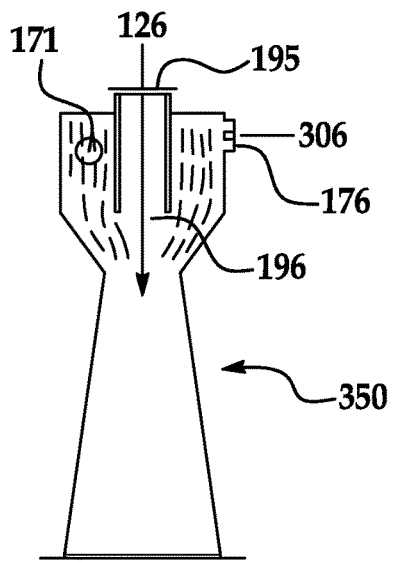

In operation the quad-scrub system 300 with a scrub tank 302 is supplied with off-gas 126 from the reactor 118 under negative pressure via the primary scrubbing venturi 350 that is described in greater detail with respect to FIG. 4B. The venturi 350 is a tubular design with transitional region (TR) and a choke (C) such that fluid flows through the length of venturi 350 with varying diameter in a whirling motion. To avoid undue drag, a venturi 350 typically has an entry cone of 15-50 degrees and an exit cone of 2-10 degrees. As fluid flows through the venturi 350, the expansion and compression of the fluids cause the pressure inside the venturi 350 to vary as a function of position. As liquid passes through the venturi, the liquid speed increases as the diameter decreases; and a second stream of fluid is intermixed via a sidearm in the venturi 350. As used herein, a fluid denotes a liquid or gas. At the end of the venturi 350, a mixture of liquid, condensates and gaseous vapors is transferred into the lower neck of the scrub tower 351. The scrub tower 351 incorporates an impingement scrubber 304 followed by counter current spray scrubber 305. Scrub fluid 306 held in the scrub tank 302 and is pumped via a pump 318 which maintains and supplies the primary scrubbing venturi 350 with the appropriate volume and pressure of scrub fluid 306. In addition, the scrub fluid 306 is also cooled within the closed-loop transit via a primary heat exchanger 310 that regulates the temperature of the scrub fluid 306 based on controlling the parameters of cooling water temperature and flow rate supplied to the opposite side of heat exchanger 310. The mixture of the off-gas vapors 126 and entrained fluids and condensates are drawn into the secondary scrub tower 351 and the impingement scrubber 304 incorporated therein via the reduced pressure produced by the downstream liquid ring pump (LRP) 308. In some inventive embodiments, the gaseous vapors pass through a third counter flow spray scrubbing section in the upper neck of the scrub tower 351 where the scrub fluid 306 is reduced in temperature via a secondary heat exchanger 311.

In operation the quad-scrub system 300 with a scrub tank 302 is supplied with off-gas 126 from the reactor 118 under negative pressure via the primary scrubbing venturi 350 that is described in greater detail with respect to FIG. 4B. The venturi 350 is a tubular design with transitional region (TR) and a choke (C) such that fluid flows through the length of venturi 350 with varying diameter in a whirling motion. To avoid undue drag, a venturi 350 typically has an entry cone of 15-50 degrees and an exit cone of 2-10 degrees. As fluid flows through the venturi 350, the expansion and compression of the fluids cause the pressure inside the venturi 350 to vary as a function of position. As liquid passes through the venturi, the liquid speed increases as the diameter decreases; and a second stream of fluid is intermixed via a sidearm in the venturi 350. As used herein, a fluid denotes a liquid or gas. At the end of the venturi 350, a mixture of liquid, condensates and gaseous vapors is transferred into the lower neck of the scrub tower 351. The scrub tower 351 incorporates an impingement scrubber 304 followed by counter current spray scrubber 305. Scrub fluid 306 held in the scrub tank 302 and is pumped via a pump 318 which maintains and supplies the primary scrubbing venturi 350 with the appropriate volume and pressure of scrub fluid 306. In addition, the scrub fluid 306 is also cooled within the closed-loop transit via a primary heat exchanger 310 that regulates the temperature of the scrub fluid 306 based on controlling the parameters of cooling water temperature and flow rate supplied to the opposite side of heat exchanger 310. The mixture of the off-gas vapors 126 and entrained fluids and condensates are drawn into the secondary scrub tower 351 and the impingement scrubber 304 incorporated therein via the reduced pressure produced by the downstream liquid ring pump (LRP) 308. In some inventive embodiments, the gaseous vapors pass through a third counter flow spray scrubbing section in the upper neck of the scrub tower 351 where the scrub fluid 306 is reduced in temperature via a secondary heat exchanger 311.

It is appreciated that less than complete quad-scrub system 300 is operative to affect purification and heat exchange, yet at the cost of reduced material throughput or process condition control. By way of example, a bubbler or other conventional mixing chamber replaces a venturi 350 or passive mixing is allowed to occur. Similarly, a condenser having a suitable number of theoretical plates of separation functions to distill liquid hydrocarbons into fractions albeit absent the thermal efficiencies of the system 300.

The off-gas vapors that exit the scrub tower 351 are pulled into the suction side of the LRP pump 308. In certain embodiments, the off-gas vapors withdrawn are subjected to a fourth scrubbing, washing, additional separation, or a combination thereof. The gas vapors exiting the LPR pump 308 under pressure enter into a gas/water separation chamber 309 and then move downstream from the system 300 as cooled, cleaned gas vapors. The scrub tank fluid 306, in some embodiments, is also side stream filtered through a filtration loop 316 incorporated into the "closed loop" scrub system. The side stream filtration loop 316 in inventive embodiments where present invention includes one or a combination of filtration and separation technologies that illustratively include a bag filter system 314, a centrifuge 312, UF membrane 315, or a combination thereof to remove oils and fine solids on a continuous basis to maintain the transfer efficiency of the scrub fluid.

Water and or alternative scrub fluid levels are monitored by liquid level sensor 301, and fluid is added or removed from the scrub tank 302 via valves 322 and 323. The scrub tank 302 incorporates a safety vent pipe 303 to release excess gaseous vapors to regulate and maintain given the depth of the water column surrounding the lower neck of the submerged secondary scrub tower 351. It is appreciated that the vent pipe 303 provides a non-mechanical safety relief in the instance of a downstream system failure of the LRP 308 due to mechanical issues or a power outage.

Figure 3:
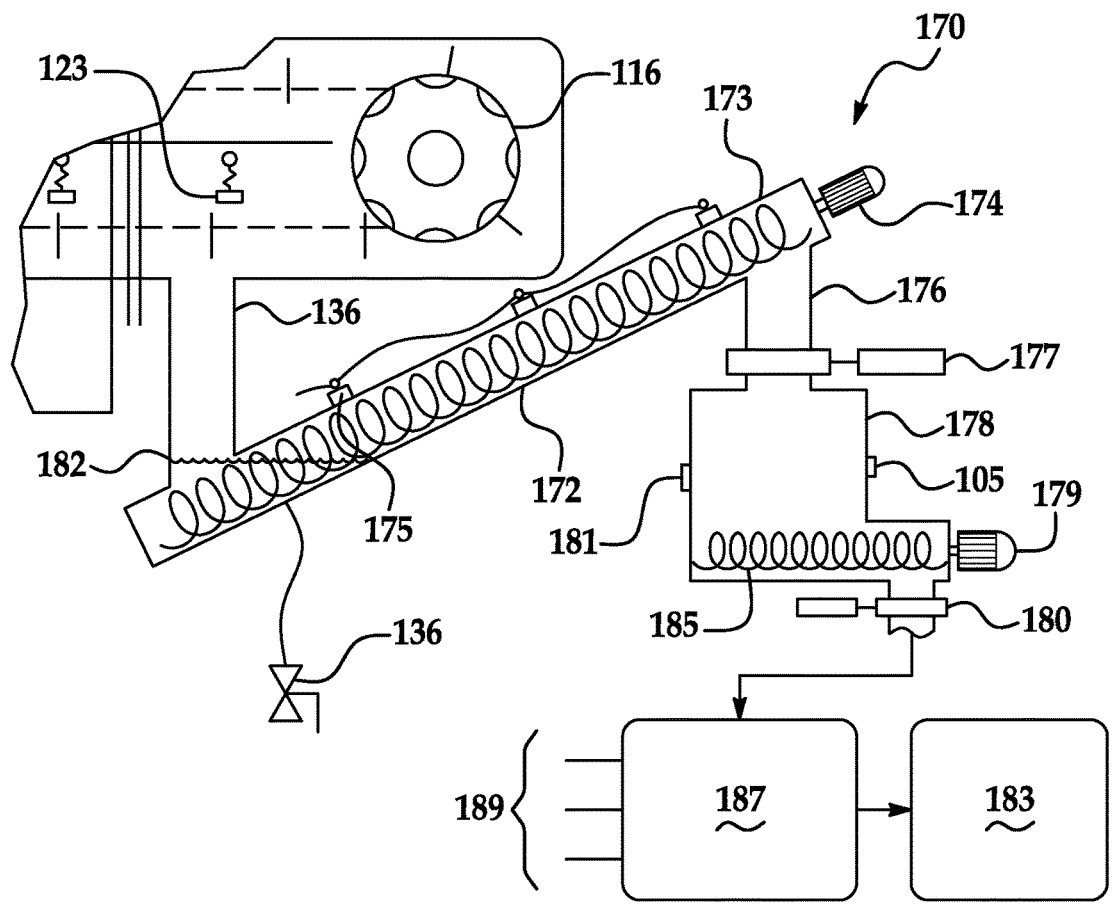
FIG. 3 is a detailed view of an activated carbon char discharge system for implementation with the system of FIG. 1.

FIG. 3 illustrates a detail view of a carbonaceous product discharge system 170 for implementation with the system of FIG. 1, in which like numerals having the meanings attributed thereto with respect to the aforementioned figures. The carbonaceous product discharge system 170 is positioned at the output of the chute 136. Water level quenches 182 maintains the system 100 atmospheric seal. A carbonaceous product discharge auger system 172 that is driven by auger motor 174 collects material from the chute 134 and carries the carbonaceous product up towards the drop channel 176. In some embodiments, water or reagents are sprayed on and mixed into the carbonaceous product via nozzles 175 along the auger tube 173 to cool and/or react with the carbonaceous product. From the tube, the carbonaceous product drops through the channel 176, with the top chute valve 177 open thereby filling the discharge hopper 178 with a hopper auger 185 driven by motor 179 and while lower chute valve 180 is closed to maintain the atmospheric seal. Reaction chemicals and/or low pressure steam at a temperature of between 150-320° C., (300-600° F.) are injected via inlet 181 into the discharge hopper 178 to assist the carbon activation process. Once the hopper is full of carbonaceous product per signal from level sensors 105, the top discharge chute valve 177 closes and the lower discharge chute valve 180 opens releasing the carbonaceous product onto a secondary conveyor for transport and/or additional processing.

The carbonaceous product exiting lower discharge valve 180 retains a sizing associated with the feedstock. In certain embodiments, it is desired to resize the carbonaceous product that is friable and well suited for sizing and/or grading. Conventional cyclonic or ball mill sizing equipment is employed at 187 for this purpose, along with ancillary power/VFD, sensor, and actuator feeds shown generally at 189. In some inventive embodiments, pelletizing and briquetting equipment 183 forms the carbonaceous material into pellets or other preselected shapes collectively termed herein as pellets.

FIGS. 4A and 4B illustrate a prior art venturi design (FIG. 4A) and an improved venturi design (FIG. 4B), in which like numerals having the meanings attributed thereto with respect to the aforementioned figures, that are readily employed in the scrubbing system of FIGS. 1 and 2. In a prior art venturi, as shown in FIG. 4A, scrub water 306 is turned into water mist and vapor 171 that splashes and enters a side gas inlet connection 194 that supplies off-gas 126, thereby causing a premature cooling effect of solids and tar condensation that results in a buildup and plugging of the gas inlet. The clogging of the side gas inlet 194 creates operational and maintenance issues. In contrast, the inventive venturi configuration of FIG. 4B prevents water from errantly splashing or migrating into the incoming gas stream and inlet fitting 196 thereby minimizing the clogging of the off-gas feed 195. Water is injected into port 198 and injected in to the venturi chamber through spray heads 196 in the direction of travel of the gas, and away from the gas inlet connection 194.

FIG. 5A illustrates a detailed view of a waste heat boiler and turbine generator system 200 that is part of the system of FIG. 1 in which like numerals having the meanings attributed thereto with respect to the aforementioned figures. Recovered waste heat in the form of oven exhaust gas 125 from the reactor oven 118 is used in a conventional waste heat boiler 202 to produce steam 206 that drives steam turbine 204 for power generation capable of producing reliable base load power 205. Active bus-based inverters are appreciated to be well suited for modulating power so produced. The low pressure steam is heated to about 300° F. (139° C.)-600° F. (315° C.) by output co-products (bio-oil and bio-gas) along with reactor waste heat. In addition, the low pressure steam is suitable for system start-up purge 212, emergency shutdown 210, and general cleaning uses 208 prior to releasing cooled exhaust airflow 214.

FIG. 5B illustrates a detailed view of a waste heat boiler 202 and turbine 204 with a cogeneration subsystem 500 also referred to herein synonymously as a combined heat and power (CHP) that is part of a system 100' that is configured in a similar manner to the system 100 of FIG. 1, in which like numerals having the meanings attributed thereto with respect to the aforementioned figures. The CHP 500 is supplied with fuel such as natural gas 502 or pyro gas 504 to run generator 506. Heated exhaust gas 508 is supplied to the reactor 118 via blower 510 to aid in heating the anaerobic thermal transformation process, thereby substantially reducing the direct heating requirements for the anaerobic thermal process.

FIG. 6 is a detailed view of the drive shaft assembly 355 for gear sprockets 116 driving the conveyor drag chain 120 through the reactor 118 of FIG. 1 in which like numerals having the meanings attributed thereto with respect to the aforementioned figures. The drive shaft assembly 355 assists in maintaining the negative pressure/vacuum of the inventive drag chain carbonizer 100 by employing an atmospherically sealed tubular flanged motor-gearbox mounting isolation chamber 357 with multi-layered sealed bearing housing assembly. The drive shaft assembly 355 includes a shaft 352 in mechanical communication with the drive motor gearbox via a machined keyway and key 353 and with drive chain gear sprockets 116 and sprocket mounting tube 117. The assembly 355 has a drilled and bolted shaft and sprocket tube drive/locating position 354, high temperature gaskets 356, a bearing 362 that allows the shaft 352 to slide and accommodate thermal shaft elongation and that fastens onto a flange boss 376 seal welded onto the reactor tube, a lock collar 366, and atmospheric barrier sealed bearing housing shaft cover 372 that bolts onto the flange boss 376. A drive motor gearbox 374 provides a sealed atmosphere packing barrier that bolts onto the tubular flanged motor-gearbox mounting isolation chamber 357, and includes a final atmospheric barrier seal cover plate 364 that fits over the lock collar 366 and bolts onto the motor-gearbox 374.

Figure 7:
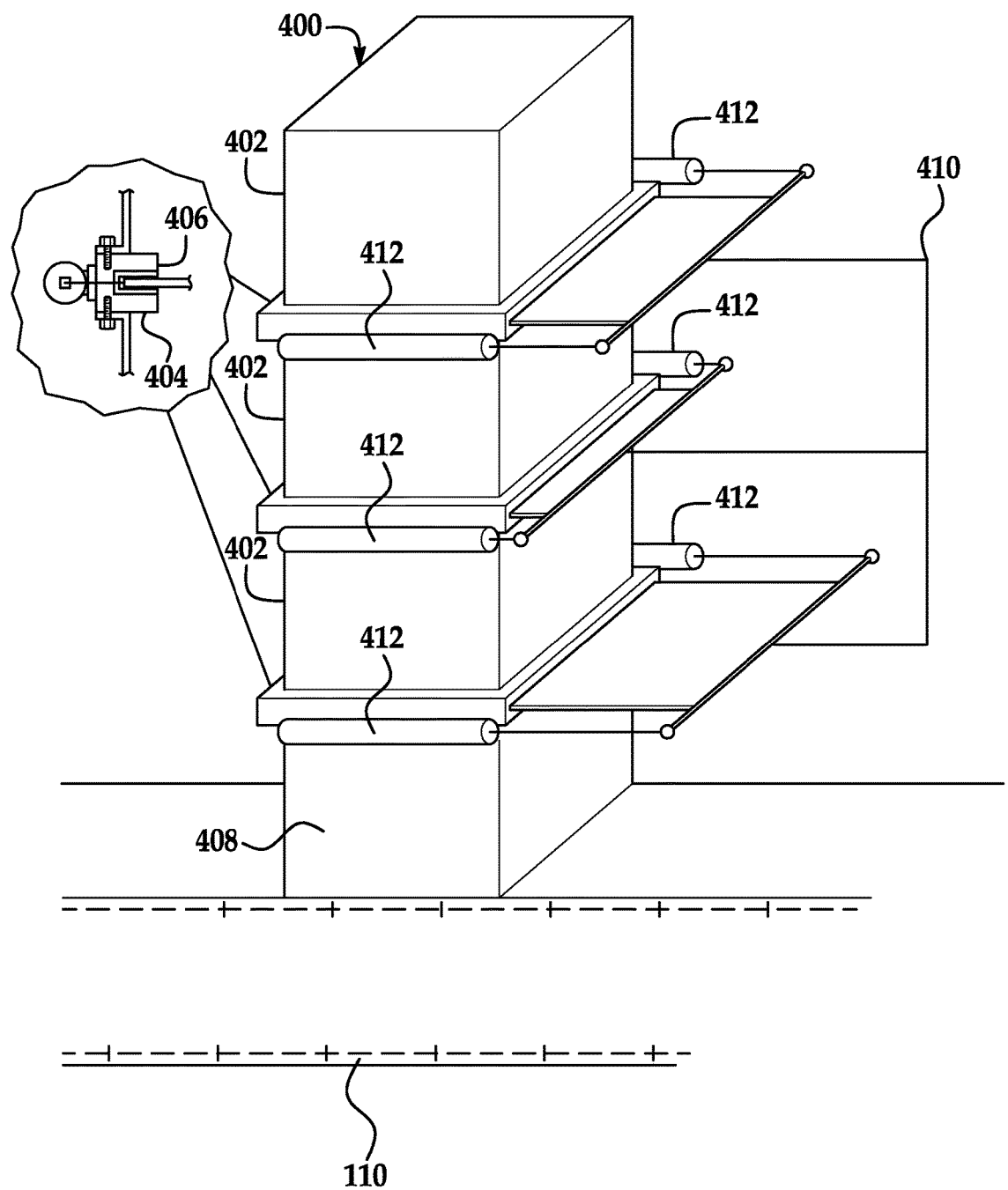
FIG. 7 is a detailed perspective view of the triple valve/tipping gate feed air lock of the system of FIG. 1.

FIG. 7 is a detailed perspective view of the triple valve/tipping gate feed air lock 400 of the system of FIG. 1 in which like numerals having the meanings attributed thereto with respect to the aforementioned figures. The tri-lock feeder and pressure equalizer system 400 (for purging, capturing, and pressure maintenance) pre-treats and meters incoming waste streams while maintaining negative pressure throughout the system 100. The tri-lock feeder 400 is configured with three air locked holding chambers 402 depicted as rectangular boxes in FIG. 7 that are joined to each other via a flange 404 on the outer edge of the holding chamber 402. It is appreciated that chambers 402 are readily formed individually and independently with a cross section that is circular, oval, triangular, and trapezoidal. A slide seal 406 keeps air from seeping in to the gate air lock 400 at the flange joints between holding chambers 402. Slide gates 410 move with guide cylinders 412 which may be hydraulic, pneumatic, or other conventional power slides. Below the three holding chambers 402 is a release chamber 408 that supplies material to the feed transfer auger 110.

In operation, the slide gates 410 are opened in a sequential order from top to bottom, with only one gate open at a time to insure zero emissions of the materials being loaded into the system 100. An embodiment of the tri-lock feeder 400 is readily configured to accept 60 cubic feet ($ft^3$) of material in two minute cycles with holding chambers 402 with dimensions of 48 inches (height) by 48 inches (width) by 48 inches (length).

Figure 8:
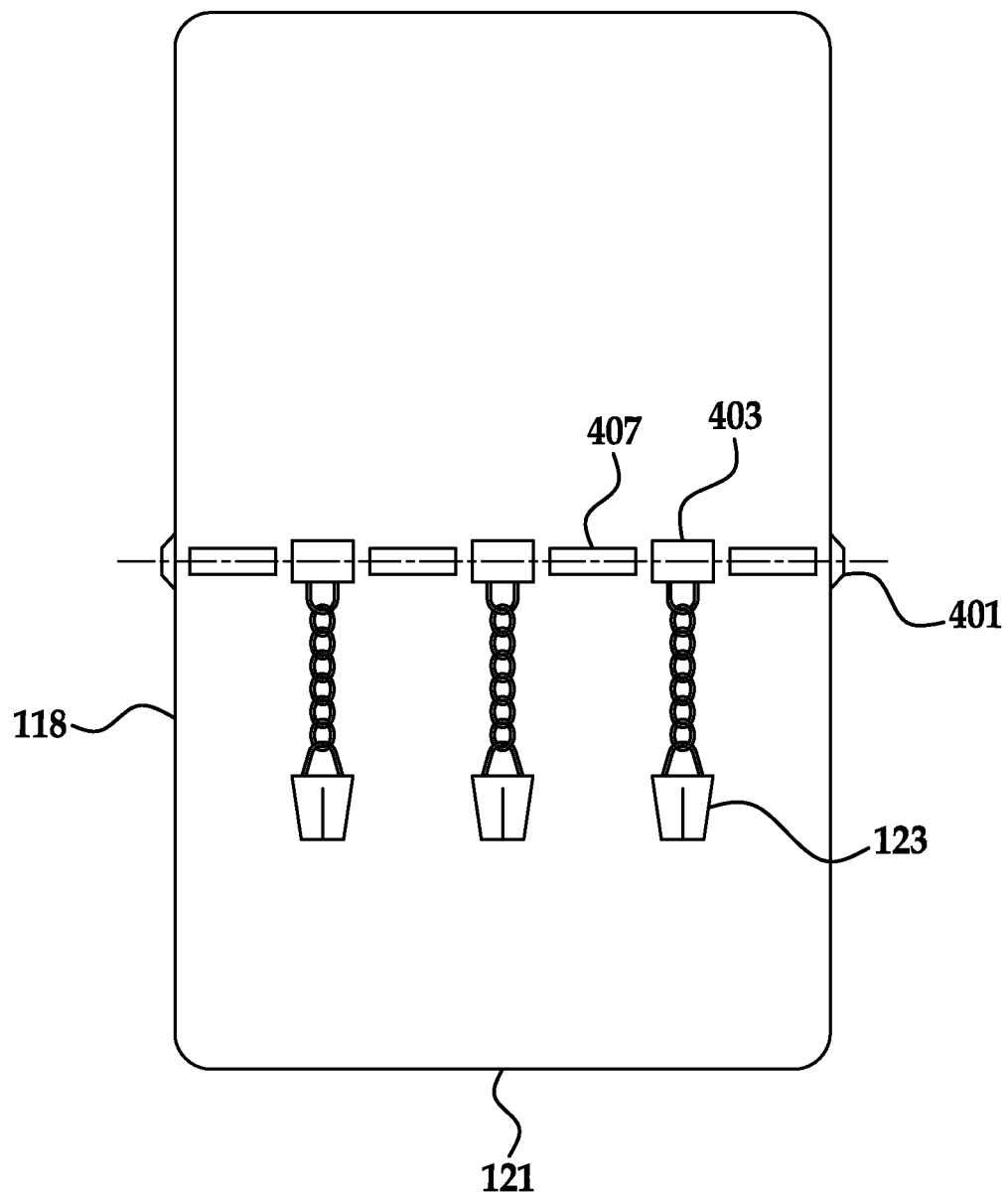
FIG. 8 is a detailed view of suspended plow blocks located down the length and width of the reactor tube of FIG. 1.
Figure 9:
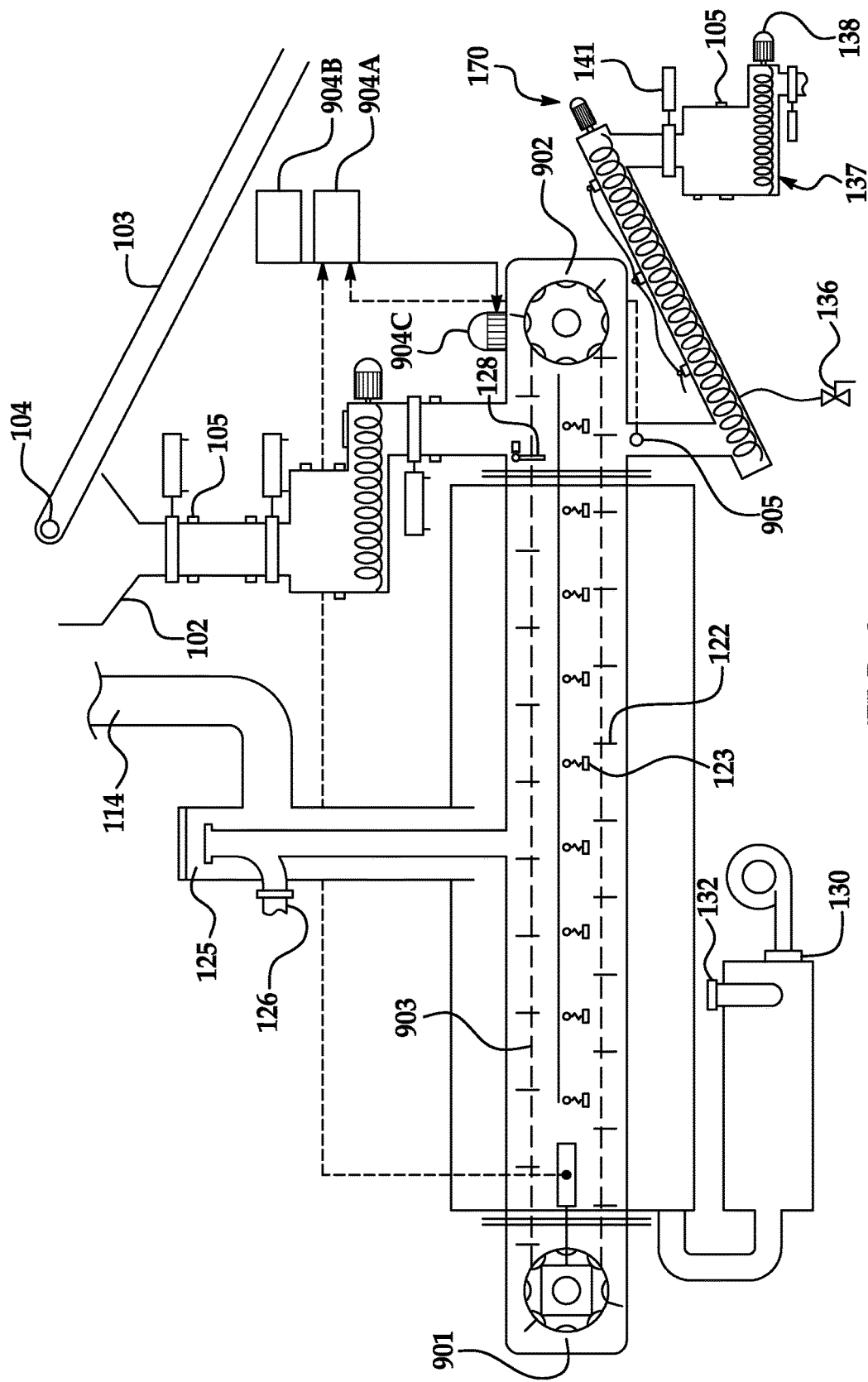
FIG. 9 is a schematic drawing illustrating the relationship between the human machine interface (HMI), the programmable logic controller (PLC) the variable frequency drive (VFD) motor and the gearbox which actuates the drive chain.
Figures 10, 11:
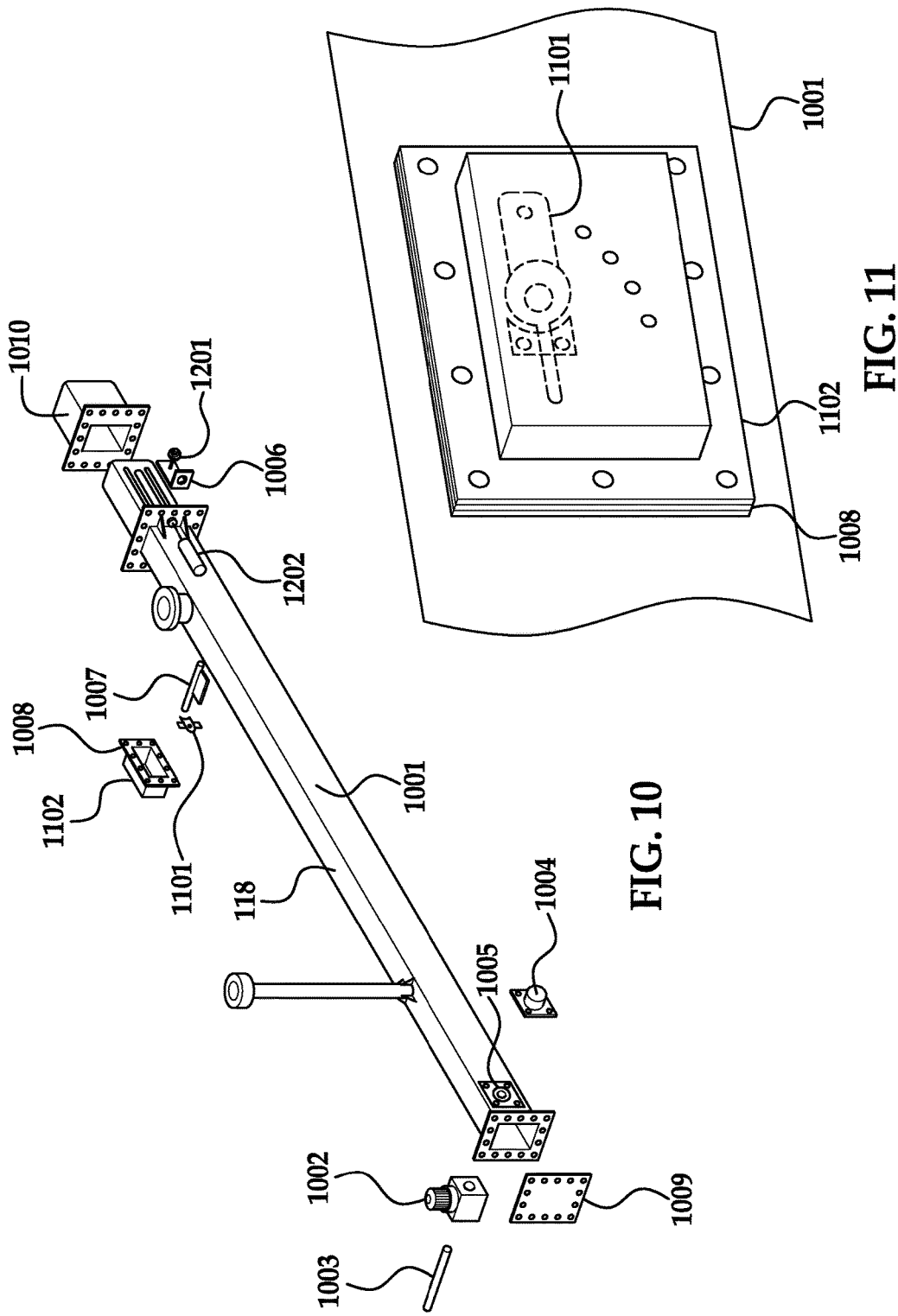
FIG. 10 is an assembly schematic illustrating the construction of the inventive reactor tube.
FIG. 11 is a detailed view of the adjustable bed depth mechanism and seal.

FIG. 8 is a detailed view of the suspended chain hanger plow blocks 123 randomly located down the length and width of the reactor 118 of FIG. 1 in which like numerals having the meanings attributed thereto with respect to the aforementioned figures. The suspended plow blocks 123 are supported by a solid rod 401 that is greater in length and fitted inside the cross sectional width of the reactor tube 118 via larger diameter holes drilled in directly opposing locations suspending the rod under the chain returns and above the reactor inside bottom surface 121 of FIG. 1. The rod 401 supports 1 to 5, or more, plow blocks 123 where the chain is fixed to the hanger 403 and the chain links hang with a plow block 123 of various shapes and weight are connected to the opposite end hanging in a fashion that allows them to drag through the material travels the length of the reactor bed 121. The chain hanger plow blocks 123 are spaced apart and located on the length of the rod 401 utilizing spacer tubes 407 illustratively formed of steel tubing with an inner diameter larger than the outside diameter of the rod 401 and cut to the desired spacer length that then slide over the rod 401 and are fitted between the plow blocks 123 and/or side wall of the reactor tube 118. Once the rod 401 is installed through the reactor tube with the hanger blocks 123 and spacers 407 in position the rod is seal welded on the outside of the reactor tube 118.

FIGS. 9-12 are illustrative of a specific embodiment of the inventive waste processing reactor in which like numerals having the meanings attributed thereto with respect to the aforementioned figures. The inventive tube reactor is an atmospherically controlled reactor chamber with drag chain sprocket axle assemblies (901, 902, 1005, 1006) at each end of the tube 1001 providing chain drive guidance 903 and tensioning with a single sealed drive axle penetration at the gearbox 1002 where the sealed gearbox 1002 fastens. The sealed gearbox 1002 acts as a packing seal as the drive shaft 1003 that is keyed and penetrates the gearbox 1002 also includes a sealed cover 1004 which makes the entire gearbox/drive mechanism air-tight. All flange mounts are sealed by virtue of bolt on air-tight fabricated covers 1009 and gaskets that fasten on over the shaft/bearing mechanism flanges which are seamed welded to the side of the reactor tube 1001.

The ability to control the feed material bed depth is important for regulating heat transfer in relationship to temperature and processing time. A mechanically multiple position adjustable bed depth mechanism 1101 regulates the maximum allowable height of the feed material being internally transported through the reactor tube 1001 by the drag chain bars from the feed zone which is deposited into the reactor upstream of the bed depth regulating plate 1007 and moved along under the plate and into the downstream reactor heating zone. The bed depth regulating mechanism 1101 is atmospherically sealed by fastening on the air-tight cover 1102 and gasket 1008 onto the mechanism flange which is seamed welded to the side of the reactor tube 1001.

Figure 12:
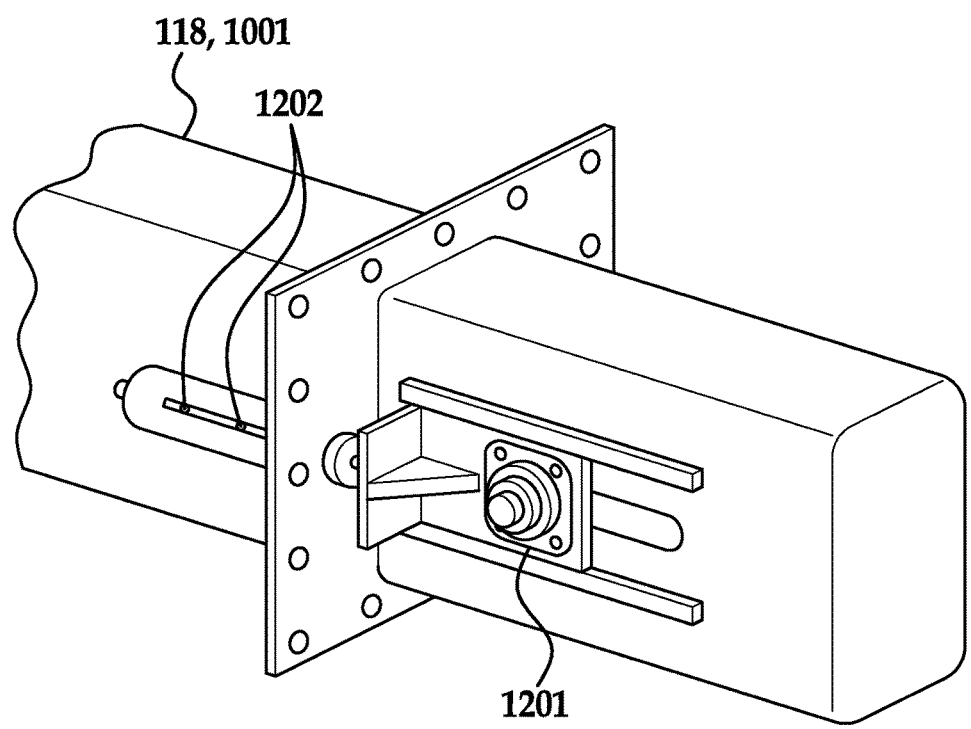
FIG. 12 is a detailed view of the chain tensioning mechanism of FIG. 1.

Automated chain tensioning mechanism 1201 of FIG. 12 features a sliding axle arrangement designed to maintain proper engagement tension on the drag chain as the reactor tube heats and cools by virtue of two pneumatically controlled linear actuators 1202 that provide an excess of force on each side of the chain sprocket axle sliding bearing flange mounts needed to maintain proper axle alignment. The chain tensioning mechanism is atmospherically sealed by fastening the air-tight cover and gasket onto the mechanism flange which is seamed welded around the outside of the reactor tube. Position sensors, such as 905 and other sensors located on each actuator provides a signal to the programmable logic controller (PLC) 904A which allows the operator to monitor the axle position as well as provide automated warning and alarm signals for conditions outside the normal operating range. In in still other inventive embodiments the tensioning mechanism may be controlled by a PLC. Position sensors also provide information and control signals to the human management interface (HMI) 904B and variable frequency drive (VFD) motors 904C. Sprocket and drag bars are designed to work with standard specification NACM industrial chain. Inventive embodiments of the reactor tube 118 and 1001 make use of stock/standard structural seamless welded mill tubing.

Figure 13:
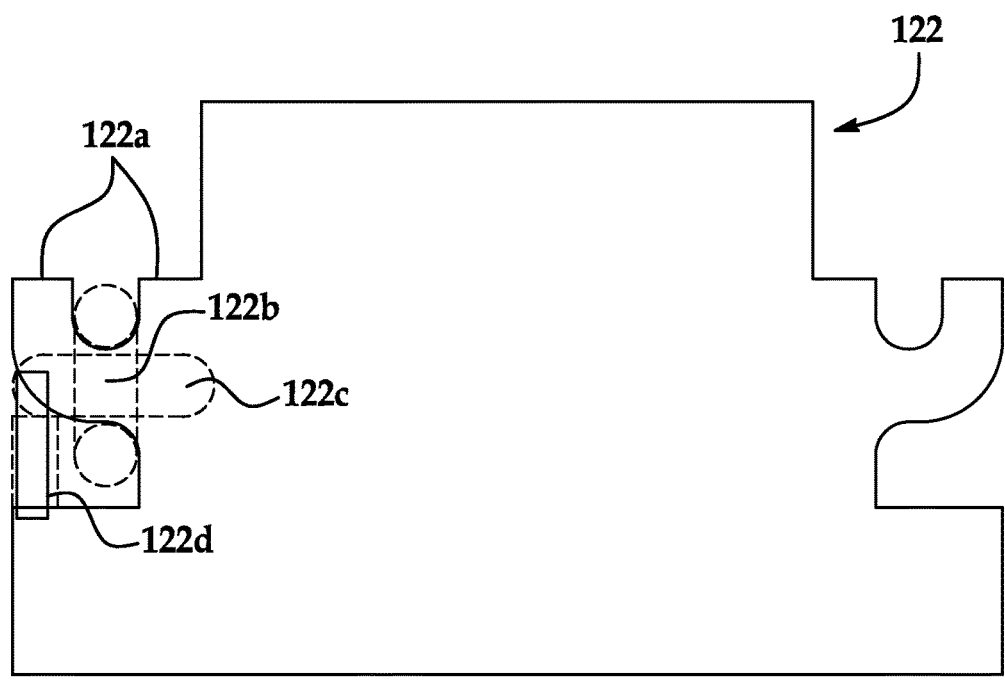
FIG. 13 is a detailed view of a double deck reactor tube drag chain bar.

FIG. 13 depicts a drag-chain blade 122 of drag-chain 120. The blade 122 solves many problems associated with conventional blades in which the linkages between sequential blades become fouled with feedstock particulate that precludes flexing of the drive chain sprocket 116. The blade 122 has a cut out 122a defining gaps into which two joined chain links 122b and 122c are used to secure a like paddle to that shown in FIG. 13. As the blade 122 has symmetric cut-outs 122a on opposite ends, the blade 122 is joined to at both ends to form a continuous drag chain. A locking key 122d assures retention of blade 122 to an adjacent blade.

Figure 14:
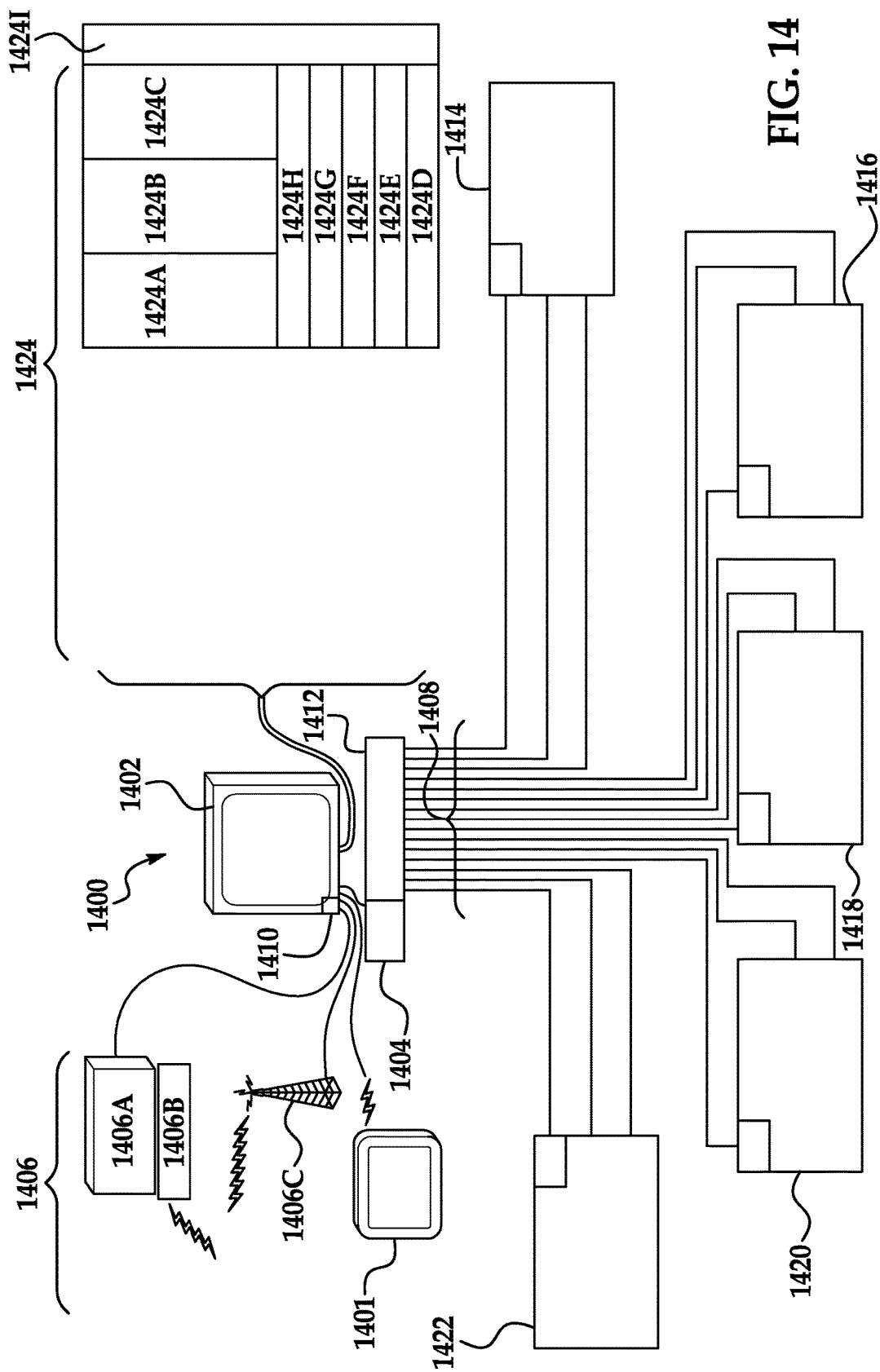
FIG. 14 is a detailed block diagram of an exemplary computer Human Management Interface (HMI) and associated programmed logic computer (PLC) for control of the drag chain reactor based carbonizer of FIG. 1.

FIG. 14 provides a detailed block diagram of an embodiment of a computer based control system 1400 for control of inventive embodiments of the drag line reactor based carbonizer as described above in FIGS. 1-13. It is noted that some or all of the exemplary architecture shown for the human management interface (HMI) 1402 and programmable logic controller (PLC) 1404 may be implemented with software deployed on one or more servers, as well as by a Service Oriented Architecture (SOA) server and/or a local or remote operation center server and/or workstations, interacting in a larger set of enterprise resources employing various technology and call centers, data centers and server centers, and/or client computers on the other end of a simple to complex communications network as shown in FIG. 14 as ending in a generalized Internet-based communications network 1406, that includes some or all of these capabilities: local area network (LAN) routers, or wide area network (WAN) routers 1406A, and virtual private network (VPN) 1406B carried by Ethernet or wireless transmission 1406C. Similarly, the architecture shown for computer HMI 1402 and PLC 1404 can be utilized to support other software and processes described throughout this description.

The computer based HMI 1402 and PLC 1404 may include a processor unit that is coupled to a system bus 1408. A video adapter and network interface card (NIC) 1410 drives/supports visual display of the HMI 1402 and is also coupled to system bus 1408 and a local process command repeater 1401. In certain inventive embodiments, the system bus 1408 may have video bus, cross-internet virtual private network (VPN), or other communications capabilities. The system bus 1408 is coupled via a bus bridge or a channel architecture to an Input/Output (I/O) bus 1412 and/or to the PLC 1404. The PLC 1404 is a special purpose, real-time, interrupt driven computer with its own set of computing components and a real-time operating system specifically intended to manage sensors, actuators and motors, amongst other real-time devices. In the inventive system shown in FIGS. 1-13, the various subsystems are controlled via the system bus 1408. The system bus 1408 provides a control communications link to variable frequency drive (VFD) motors, sensors, and actuators that make up the following subsystems: gas vapor scrubbing 1414, side stream filtration and post processing 1416, reactor/feed/discharge 1418, input material pretreat and movement 1420, and process heat generation 1422. In an embodiment, a VFD motor providing variable speed control of the drag chain is synchronized with a separate VFD motor that controls the tri-lock feed metering. It is noted that additional subsystems and functional circuits and controls may be connected to system bus 1408 in embodiments of the invention. An I/O interface 1412 is coupled to I/O bus that constitutes the system bus 1408. The I/O interface 1412 affords communication with various I/O devices, including a keyboard, a mouse, a thumb drive or other USB storage device, optical drives including Compact Disk-Read Only Memory (CD-ROM) drive and DVD, a floppy disk drive, and a flash drive memory. The format of the many different types of ports connected to I/O interface may be any known to those skilled in the art of computer architecture, including but not limited to the aforementioned Universal Serial Bus (USB) ports.

In other inventive embodiments, a computer implementing the HMI 1402 is able to communicate with a software deploying server 1424 via a network (internet or a dedicated network) using a network interface 1410, which is coupled to system bus via various types of network interface hardware and software sub-systems. Types of Networks may, include, but are not limited to an external network such as the Internet, or an internal network such as an Ethernet or a Virtual Private Network (VPN). It is noted that the software deploying server 1424 may utilize a same or substantially similar architecture as the computer implementing the HMI 1402.

Certain embodiments of the software deploying server 1424 described in greater detail below may be a general purpose computer running a standard operating system (OS). Software may include rules driven command and control software—that may be service oriented architecture (SOA) driven 1424A, process recipes (as data files) 1424B, and process programming software and real-time OS interrupt software 1424C. The operations of the software deploying server 1424 may be broken up into inter-operational functional blocks including: enterprise service management (ESM) 1424D, hardware interrupts 1424E, Basic Input/Output System (BIOS) 1424F, operating system (OS) 1424G, process code interrupter 1424H, recipe management 1424B, process programming 1424C, and hardware, data I/O, and storage 14241.

Software deploying server 1424 may include a hard drive, flash drive, EPROM, DRAM or hardware disc drive interface, and the like, which acts as a programming and/or data storage sub-system that is also coupled to system bus. The hard drive interface interfaces with the hard drive or the like. In an embodiment, a hard drive populates a system memory, which is also coupled to system bus. System memory is defined as a lowest level of volatile memory in a computer. This volatile memory includes additional higher levels of volatile memory (not shown), including, but not limited to, cache memory, registers and buffers. Data that populates system memory includes a computer operating system (OS), and/or real-time operating systems, BIOS, utilities, and other sub-system components, application programs, ladder (an open international standard IEC 61131 for programmable logic controllers), and operating data, called recipes or processing instructions, settings, sensor ranges, speed ranges, and the like, in this system of systems.

The OS for the HMI 1402 provided by software deploying server 1424 includes, but is not limited to, a shell, for providing transparent user access to resources such as application programs and data. Generally, a shell is a program that provides an interpreter and/or a compiler, an interface between the user and the operating system. More specifically, the shell executes commands that are entered into a command line user interface or from a file. Thus, a shell (also called a command processor) is generally the highest level of the operating system software hierarchy, and serves as a command interpreter. The shell provides a system prompt, interprets commands entered by keyboard, mouse, or other user input media, and sends the interpreted command(s) to the appropriate lower levels of the operating system (e.g., a kernel and/or a real-time operating system or both) for processing. It is noted that while a shell is a text-based, line-oriented user interface, the present invention will also support other user interface modes, such as graphical, voice, gestural, etc. The OS also includes a kernel and its alternatives and combinations, which includes lower levels of functionality for OS, including providing essential services required by other parts of OS and application programs and ladder programming, including memory management, process and task management, disk management, and mouse and keyboard management.

Application programs resident on software deploying server 1424 include a browser or other internet interface programming software. The browser may include program modules and instructions enabling a World Wide Web (WWW) client (i.e., computer) to send and receive network messages to the Internet using HyperText Transfer Protocol (HTTP) messaging, or other internet communications and security protocols and software, thus enabling communication with software deploying server and/or remote computers that manage the operation of the computer performing as software deploying server 1424.

Application programs on the software deploying server 1424 computer's system memory also include a Consolidated Business Service Logic (CBSL) Layer and/or applications software suite. CBSL includes code for implementing the processes described herein. In one embodiment, the HMI 1402 computer is able to download CBSL from the software deploying server 1424, including in an "on-demand" or cloud computing basis, as described in greater detail below.

The hardware elements depicted in the HMI 1402 computer and software deploying server 1424 are not intended to be exhaustive, but rather are representative to highlight essential components required by the present invention. For instance, computers used in embodiments of the invention may include alternate memory storage devices such as magnetic cassettes, Digital Versatile Disks (DVDs), Bernoulli cartridges, solid state and/or flash memory configured to operate as disc drives, thumb/USB memory drives, and the like. These and other variations are intended to be within the spirit and scope of the present invention.

Within a certain embodiment of the inventive OS and application software suite used in HMI 1402 computer and software deploying server 1424, and/or the servers and other computers connected to across the internet is an SOA (services oriented architecture). Such an SOA architecture may employ a real-time sub-system to permit the PLC 1404 to communicate with the system computers while other services, include rules processing using a rules processing software suite.

In certain other inventive embodiments, a bi-directional portal software suite provides an interface for incoming and outgoing messages between the SOA software services and the enterprise resources such as formula composers and managers, rules composers and managers, and HMI interfaces, as examples. In certain other inventive embodiments, the enterprise resources utilize a format that is unintelligible to the SOA software services. For example, one of the enterprise resources, such as an interface to the PLC 1404, may utilize an operating system, application program (or version thereof), data format (voice, data, video, etc.), etc. that is not understood and/or supported by any of the SOA software service. Thus, bi-directional portal may include logic for translating, preferably by using Extensible Markup Language (XML) code, incoming messages from one or more of the enterprise resources into a format that can be understood/handled/processed by one of the SOA software services and transferred, once translated, to the appropriate enterprise resource.

The incoming messages from the enterprise resources are illustratively inputs about events that occur within and/or are generated by the enterprise resources. These events may be anomalies or normal events, and include, but are not limited to, video signals (e.g., camera feeds), voice signals (e.g., telephone calls), sensor data signals (e.g., packeted data transmissions), Simple Mail Transfer Protocol (SMTP) alert messages (e.g., e-mail alerts warning of a problem within one or more of the enterprise resources), Simple Network Management Protocol (SNMP) system alerts (e.g., network-based alerts warning of a problem within one or more of the enterprise resources), handheld radio transmissions (e.g., "walkie-talkie" traffic that is locally captured by a repeater tower), and other protocols for voice data such as SNTP (Simple Network Time Protocol for data), and H.323 for voice protocols and systems alerts directly generated by agents that directly, or through additional electronic or optical circuitry, sense operational status and performance status, etc.

The strategy set of rules within server 1424 manages operation of all activities within the SOA architecture of enterprise resources (one of which may be the PLC), and may define pre-set responses to an event described by one or more of the incoming messages from the enterprise resources. These pre-set responses are provided by one of the SOA software services, which may be referred to as an SOA response service (not separately depicted from SOA software services).

An aggregating logic aggregates incoming messages from the enterprise resources in accordance with rules found in the strategy set of rules. This aggregation both aggregates and de-duplicates incoming messages. For example, aggregating logic may "know" that an event is significant only if it occurs more than a pre-determined number of times, for example from an over limit combustion chamber temperature sensor from a previously identified one or more resource (from the enterprise resources) within a predetermined time period. Similarly, if a same event is detected and reported by multiple resources, then the aggregating logic utilizes logic (from the strategy set of rules) that identifies these multiple reports as being for a same single event (e.g., multiple cameras, multiple sensors, having different viewpoints, picking up a same object/person in their fields of view).

The rules delegation logic delegates the pre-set responses to agents, which are located (respectively) in the enterprise resources for reactions. These agents have been pre-deployed to the enterprise resources from the enterprise service management (ESM) layer in computer server 1424, and may be responsible for actually allocating the pre-set response to their local enterprise resource. The ESM layer also supports at least one User Defined Operating Picture (UDOP). The UDOP is user-configured to permit a user to select one or more of the enterprise resources for viewing alarms, activities, etc. Note that the UDOP is not merely a dashboard, but rather provides the user with sufficient granularity to view specific activities within a particular resource from the enterprise resources. For example, the UDOP may be a heat map of multiple (user-selected) resources from the enterprise resources. This heat map is a color-coded representation that shows levels of activity (either normal or anomalous) occurring in real-time within the viewed resources. If a particular resource shows unusually high activity (as represented by a changed in color, such as from green to yellow or red), the user can further investigate the resource's activities to determine the cause of the increased activity.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, thumb or USB drives, and/or optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system in the form of hardware, software, or a combination of software and hardware as described herein or their equivalents.

As used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

Software Deployment

As described above, in one inventive embodiment, the processes described by the present invention, including the functions of CBSL, are performed by service provider server. Alternatively, CBSL and the method described herein, and in particular as shown and described in FIG. 14, can be deployed as a process software from service provider server, such software deploying server 1424, to HMI 1402 and PLC 1404 computers. Still more particularly, process software for the method so described may be deployed to a service provider server by another service provider server (not shown). As an example, a service provider server begins the deployment, also called provisioning, of the process software. With an initial provisioning step being to determine if there are any programs that will reside on a server or servers when the process software is executed. If this is the case, then the servers that will contain the executables are identified. The process software for the server or servers is transferred directly to the servers' storage via File Transfer Protocol (FTP) or some other protocol or by copying though the use of a shared file system. The process software is then installed on the servers. Next, a determination is made on whether the process software is to be deployed by having users access the process software on a server or servers. If the users are to access the process software on servers, then the server addresses that will store the process software are identified.

Furthermore, a determination is made if a proxy server is to be built to store the process software. A proxy server is a server that sits between a client application, such as a Web browser, and a real server. The proxy server intercepts all requests to the real server to see if it can fulfill the requests itself. If not, the proxy server forwards the request to the real server. The two primary benefits of a proxy server are to improve performance and to filter requests. If a proxy server is required, then the proxy server is installed. The process software is sent to the servers either via a protocol such as FTP or the process software is copied directly from the source files to the server files via file sharing. In an another embodiment, a transaction is sent to the servers that contains the process software and have the server process the transaction, then receive and copy the process software to the server's file system. Once the process software is stored at the servers, the users, via their client computers, then access the process software on the servers and copy to their client computers file systems. In still another inventive embodiment, the server automatically copies the process software to each client and then run the installation program for the process software at each client computer. The user executes the program that installs the process software on his client computer then exits the process.

A determination can also be made whether the process software is to be deployed by sending the process software to users via e-mail. The set of users where the process software will be deployed are identified together with the addresses of the user client computers. The process software is sent via e-mail to each of the user client computers. The users then receive the e-mail and then detach the process software from the e-mail to a directory on their client computers. The user executes the program that installs the process software on their client computer then exits the process.

Lastly, a determination is made as to whether the process software will be sent directly to user directories on their client computers. If process software will be sent directly to user directories, the user directories are identified, and the process software is transferred directly to the user's client computer directory. The transfer can be done in several ways such as but not limited to sharing of the file system directories and then copying from the sender's file system to the recipient user's file system or alternatively using a transfer protocol such as File Transfer Protocol (FTP). The users, or software that automates the installation of the then transferred software, access the directories on their client file systems in preparation for installing the process software. The user or the installation automation software then executes the program that installs the process software on his client computer and then exits the process.

VPN Deployment

The inventive software can be deployed to third parties as part of a service wherein a third party VPN service is offered as a secure deployment vehicle or wherein a VPN is built on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or worker. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software for certain embodiments of the invention may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software. When using the site-to-site VPN, the process software is deployed, accessed and executed through the use of dedicated equipment and large-scale encryption that are used to connect a company's multiple fixed sites over a public network such as the Internet. The process software is transported over the VPN via tunneling which is the process of placing an entire packet within another packet and sending it over a network. The protocol of the outer packet is understood by the network and both points, called tunnel interfaces, where the packet enters and exits the network.

Software Integration

The process software for implementing specific embodiments of the invention includes code for implementing the process described herein, and may be integrated into a client, server and network environment by providing for the process software to coexist with applications, operating systems and network operating systems software and then installing the process software on the clients and servers in the environment where the process software will function. The first step in integration of the process software is to identify any existing software on the clients and servers, including the network operating system where the process software will be deployed, that are required by the process software or that work in conjunction with the process software. This includes the network operating system that is software that enhances a basic operating system by adding networking features. Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers are upgraded on the clients and servers to the required level. After ensuring that the software, where the process software is to be deployed, is at the correct version level that has been tested to work with the process software, the integration is completed by installing the process software on the clients and servers.

On-Demand

The process software is shared, simultaneously serving multiple customers in a flexible, automated fashion. The process software is standardized, requiring little customization and it is scalable, providing capacity on-demand in a pay-as-you-go model. The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the accessed server may make requests of other servers that require CPU units. CPU units describe an example that represents but one measurement of use. Other measurements of use include but are not limited to network bandwidth, memory utilization, storage utilization, packet transfers, complete transactions, etc.

When multiple customers (or HMI and PLC driven systems) use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory utilization, storage utilization, etc. approach a capacity so as to affect performance, additional network bandwidth, memory utilization, storage etc. are added to share the workload. The measurements of use for each service and customer are sent to a collecting server that sums the measurements of use for each customer for each service that is processed anywhere in the network of servers that provide the shared execution of the process software. The summed measurements of use units are periodically multiplied by unit costs and the resulting total process software application service costs are alternatively sent to the customer and/or indicated on a web site accessed by the customer which then remits payment to the service provider. In another inventive embodiment, the service provider requests payment directly from a customer account at a banking or financial institution. In another inventive embodiment, if the service provider is also a customer of the customer that uses the process software application, the payment owed to the service provider is reconciled to the payment owed by the service provider to minimize the transfer of payments.

In still another inventive embodiment, a support server is located on the Internet begins the on-demand process. A transaction is created than contains the unique customer identification, the requested service type and any service parameters that further, specify the type of service. The transaction is then sent to the main server. In an on-demand environment the main server can initially be the only server, then as capacity is consumed other servers are added to the on-demand environment.

The server central processing unit (CPU) capacities in the on-demand environment are queried. The CPU requirement of the transaction is estimated, then the server's available CPU capacity in the on-demand environment are compared to the transaction CPU requirement to see if there is sufficient CPU available capacity in any server to process the transaction. If there is not sufficient server CPU available capacity, then additional server CPU capacity is allocated to process the transaction. If there was already sufficient available CPU capacity then the transaction is sent to a selected server. Before executing the transaction, a check is made of the remaining on-demand environment to determine if the environment has sufficient available capacity for processing the transaction. This environment capacity consists of such things as but not limited to network bandwidth, processor memory, storage etc. If there is not sufficient available capacity, then capacity will be added to the on-demand environment. Next the required software to process the transaction is accessed, loaded into memory, then the transaction is executed.

The usage measurements are recorded. The utilization measurements consist of the portions of those functions in the on-demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer.

If the customer has requested that the on-demand costs be posted to a web site, then they are posted. If the customer has requested that the on-demand costs be sent via e-mail to a customer address, then these costs are sent to the customer. If the customer has requested that the on-demand costs be paid directly from a customer account, then payment is received directly from the customer account.

While the present invention has been particularly shown and described with reference to a preferred embodiment, it will be understood by those skilled in the art that various changes in form and detail may be made therein without departing from the spirit and scope of the invention. For example, while the present description has been directed to a preferred embodiment in which custom software applications and process formulas or recipes, and rules are developed, the invention disclosed herein is equally applicable to the development and modification of application software which supplement or replace the recipes.

The invention claimed is:

1. A waste processing system for pyrolysis of an organic feedstock material comprising:
at least one atmospherically sealed reactor tube receiving the organic material feedstock through an inlet and having an outlet;
at least one drive chain sprocket mounted on a rotatable drive axle extended through said reactor tube;
a drag-chain mechanically interconnected to said at least one drive chain sprocket;
at least one sealed gearbox mechanically connected to said drive axle, said sprocket and at least one variable frequency drive motor (VFD) for control of a direction of the drag-chain, an angle of a dwell bed within the reactor tube, and a speed of the drag-chain;
an elevated temperature atmosphere in said reactor tube heated with oxygen depleted oven exhaust to promote the pyrolysis of the organic feedstock to produce in concurrent operation a product mix of carbonaceous material, bio-oil and ash;
at least one programmable logic controller (PLC) controlling said VFD and said elevated temperature environment as to parameters of bed depth; the speed of the drag-chain; temperature ranges 200 to 780° C., pressures, and continuous or real-time processing under rule-based control systems or a combination thereof;
at least one human machine interface (HMI) in electrical communication with said PLC; and
the at least one variable frequency drive motor (VFD) in electrical communication with said PLC.

2. The system of claim 1 wherein the product mix further comprises at least one of natural gas, electricity, and steam.

3. The system of claim 1 wherein the bio-oils include at least one of aromatic oils, phenols, hydrocarbon oils.

4. A waste processing system for pyrolysis of an organic feedstock material comprising:

at least one atmospherically sealed reactor tube receiving the organic material feedstock through an inlet and having an outlet;
at least one drive chain sprocket mounted on a rotatable drive axle extended through said reactor tube;
a drag-chain mechanically interconnected to said at least one drive chain sprocket;
at least one sealed gearbox mechanically connected to said drive axle, said sprocket and at least one variable frequency drive motor (VFD) for control of a direction of the drag-chain, an angle of a dwell bed within the reactor tube, and a speed of the drag-chain;
an elevated temperature atmosphere in said reactor tube heated with oxygen depleted oven exhaust to promote the pyrolysis of the organic feedstock to produce in concurrent operation a product mix of carbonaceous material, bio-oil and ash;
at least one programmable logic controller (PLC) in electrical communication with and controlling said VFD and said elevated temperature environment as to parameters of bed depth; the speed of the drag-chain; temperature ranges 200 to 780° C., pressures, and continuous or real-time processing under rule-based control systems or a combination thereof;
at least one human machine interface (HMI) in electrical communication with said PLC; and
a data input of economic and other market parameters, wherein said PLC modifies said elevated temperature environment to adjust the product mix.

5. A waste processing system for pyrolysis of an organic feedstock material comprising:
at least one atmospherically sealed reactor tube receiving the organic material feedstock through an inlet and having an outlet;
at least one drive chain sprocket mounted on a rotatable drive axle extended through said reactor tube;
a drag-chain mechanically interconnected to said at least one drive chain sprocket;
at least one sealed gearbox mechanically connected to said drive axle, said sprocket and at least one variable frequency drive motor (VFD) for control of a direction of the drag-chain, an angle of a dwell bed within the reactor tube, and a speed of the drag-chain;
an elevated temperature atmosphere in said reactor tube heated with oxygen depleted oven exhaust to promote the pyrolysis of the organic feedstock to produce in concurrent operation a product mix of carbonaceous material, bio-oil and ash;
at least one programmable logic controller (PLC) in electrical communication with and controlling said VFD and said elevated temperature environment as to parameters of bed depth; the speed of the drag-chain; temperature ranges 200 to 780° C., pressures, and continuous or real-time processing under rule-based control systems or a combination thereof;
at least one human machine interface (HMI) in electrical communication with said PLC; and
wherein said elevated temperature environment is heated by an oven chamber combusting a mixture of natural gas and gases produced in said reactor tube to produce an oxygen depleted oven exhaust.

6. The system of claim 5 wherein the oxygen depleted oven exhaust heats water to generate steam.

7. The system of claim 6 wherein the steam operates an electricity generator to produce electricity.

8. The system of claim 1 wherein the carbonaceous material is at least one of carbon black, activated carbon, bio-char, or fullerenes.

9. The system of claim 8 further comprising at least one processing device coupled to the outlet of said reactor tube to perform a process of at least one of chemical reaction of the carbonaceous material or the bio-oil, water washing, centrifuging, filtering, or pelletizing of the carbonaceous material.

10. The system of claim 9 wherein said at least one processing device is a centrifuge for separating the bio-oil into a light oil and a heavy oil.

11. The system of claim 1 wherein said PLC changes at least one operating parameter of said reactor tube of: bed depth of the organic feedstock in said reactor tube, speed of said VFD, a temperature of said elevated temperature atmosphere, "forward-reverse" walking of said drag-chain, or a chemical composition of said elevated temperature atmosphere.

12. The system of claim 11 wherein the at least one parameter is changed under continuous or real time processing under rules-based control systems, the control systems utilizing variable processing formulas, negative pressures, variable dwell time control, and other processing variable controls.

13. The system of claim 11 wherein the temperature of said elevated temperature atmosphere is determined with a series of adjustable burner control temperature set points and controlled by a feedback loop by one or more thermocouples.

14. The system of claim 1 wherein said reactor tube has said elevated temperature atmosphere at a temperature ranges between 205 to 980° C.

15. The system of claim 1 wherein a dwell time of the organic feedstock material in said reactor tube is controlled by setting a process dwell time value accessible on a control panel of said HMI for said PLC operating a computer program that maintains a desired drive motor speed VFD based on series of pre-calculated chain speed—tube length—drive motor speed combinations.

16. The system of claim 1 wherein said PLC has a scenario driven economic modeling control sub-system input based on real time market selection information for the components of the product mix.

17. The system of claim 1 wherein the organic feedstock material is at least one of medical waste, plastic waste, auto shredder waste, tires, bio-mass, waste water sludge, or bitumen, and said PLC adjusts said VFD or said elevated temperature atmosphere in response to a composition of the organic feedstock waste.

18. The system of claim 1 wherein the ash is derived from hazardous metals in soil or catalysts from waste synthetic polymers.

19. The system of claim 6 the steam is used to perform at least one system function of: clean, purge, or emergency shut-down.

20. The system of claim 12 wherein the at least one parameter is managed through a single integrated system hardware and software platform integrating said PLC.

21. The system of claim 12 wherein the at least one parameter is managed through multiple modules each performing less than a complete compliment of management functions, said multiple modules are joined to form a redundant integrated system where said multiple modules operate as back-ups during a control failure.

22. The system of claim 1 further comprising a waste heat boiler and turbine configured with a combined heat and power (CHP) unit for cogeneration that produces a heated exhaust gas, where said heated exhaust gas is supplied to said reactor tube via a blower.

\* \* \* \* \*